(12) United States Patent
Chatterjee et al.

(10) Patent No.: US 12,075,268 B2
(45) Date of Patent: Aug. 27, 2024

(54) ENHANCED PHYSICAL DOWNLINK CONTROL CHANNEL MONITORING

(71) Applicant: Apple Inc., Cupertino, CA (US)

(72) Inventors: Debdeep Chatterjee, Cupertino, CA (US); Fatemeh Hamidi-Sepehr, Cupertino, CA (US); Sergey Panteleev, Cupertino, CA (US); Toufiqul Islam, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 17/441,898

(22) PCT Filed: May 1, 2020

(86) PCT No.: PCT/US2020/031157
§ 371 (c)(1),
(2) Date: Sep. 22, 2021

(87) PCT Pub. No.: WO2020/227142
PCT Pub. Date: Nov. 12, 2020

(65) Prior Publication Data
US 2022/0201515 A1    Jun. 23, 2022

Related U.S. Application Data

(60) Provisional application No. 62/843,287, filed on May 3, 2019.

(51) Int. Cl.
*H04W 24/08*     (2009.01)
*H04L 1/00*     (2006.01)
(Continued)

(52) U.S. Cl.
CPC ........... *H04W 24/08* (2013.01); *H04L 1/0038* (2013.01); *H04W 72/0446* (2013.01); *H04W 72/23* (2023.01); *H04W 72/51* (2023.01)

(58) Field of Classification Search
None
See application file for complete search history.

(56) References Cited

U.S. PATENT DOCUMENTS 11,051,200 B2 *   6/2021   Lee ......................... H04L 25/02
11,251,995 B2 *   2/2022   Lee ..................... H04L 25/0202
(Continued)

FOREIGN PATENT DOCUMENTS

CN           106797638        5/2017

OTHER PUBLICATIONS

[No Author Listed], "3rd Generation Partnership Project; Technical Specification Group Radio Access Network; Evolved Universal Terrestrial Radio Access (E-UTRA); Physical channels and modulation (Release 15)," 3GPP TS 36.211 V15.5.0, Mar. 2019, 238 pages.

(Continued)

*Primary Examiner* — Faiyazkhan Ghafoerkhan
(74) *Attorney, Agent, or Firm* — Fish & Richardson P.C.

(57) ABSTRACT

A method for enhanced physical downlink control channel monitoring (PDCCH) includes determining a monitoring span for monitoring a PDCCH within a slot, the monitoring span having a start symbol and a duration that spans one or more symbols within the slot. At least one of a maximum number of blind decoding (BD) attempts or a maximum number of control channel elements (CCEs) for channel estimation is determined based on the monitoring span. The PDCCH is monitored within the monitoring span up to the at least one of the maximum number of BD attempts or the maximum number of CCEs.

20 Claims, 9 Drawing Sheets

(51) Int. Cl.
*H04W 72/0446* (2023.01)
*H04W 72/23* (2023.01)
*H04W 72/51* (2023.01)

(56) References Cited

U.S. PATENT DOCUMENTS

| | | | | |
|---|---|---|---|---|
| 11,758,552 | B2* | 9/2023 | Nam | H04W 72/51 370/330 |
| 2019/0045487 | A1* | 2/2019 | You | H04W 72/0446 |
| 2019/0110279 | A1* | 4/2019 | Behravan | H04L 41/0803 |
| 2019/0215098 | A1* | 7/2019 | Tiirola | H04W 24/08 |
| 2019/0253308 | A1* | 8/2019 | Huang | H04L 43/0823 |
| 2020/0314678 | A1* | 10/2020 | Lee | H04W 72/12 |
| 2020/0329389 | A1* | 10/2020 | Hosseini | H04L 5/0053 |
| 2020/0351681 | A1* | 11/2020 | Salah | H04W 72/23 |
| 2021/0028961 | A1* | 1/2021 | Lee | H04W 24/08 |
| 2021/0320821 | A1* | 10/2021 | Lee | H04W 56/001 |
| 2021/0385679 | A1* | 12/2021 | Hosseini | H04W 24/08 |
| 2022/0046616 | A1* | 2/2022 | Lin | H04W 72/23 |
| 2022/0201515 | A1* | 6/2022 | Chatterjee | H04L 1/0038 |

OTHER PUBLICATIONS

[No Author Listed], "3rd Generation Partnership Project; Technical Specification Group Radio Access Network; NR; Multiplexing and channel coding (Release 15)," 3GPP TS 38.212 V15.5.0, Mar. 2019, 101 pages.

[No Author Listed], "3rd Generation Partnership Project; Technical Specification Group Radio Access Network; NR; Physical channels and modulation (Release 15)," 3GPP TS 38.211 V15.5.0, Mar. 2019, 96 pages.

[No Author Listed], "3rd Generation Partnership Project; Technical Specification Group Radio Access Network; NR; Physical layer procedures for control (Release 15)," 3GPP TS 38.213 V15.5.0, Mar. 2019, 104 pages.

[No Author Listed], "3rd Generation Partnership Project; Technical Specification Group Radio Access Network; NR; User Equipment (UE) feature list (Release 15)," 3GPP TR 38.822 V0.0.2, May 2019, 63 pages.

[No Author Listed], "3rd Generation Partnership Project; Technical Specification Group Radio Access Network; NR; User Equipment (UE) radio access capabilities (Release 15)," 3GPP TS 38.306 V15.5.0, Mar. 2019, 49 pages.

[No Author Listed], "3rd Generation Partnership Project; Technical Specification Group Services and System Aspects; Architecture enhancements for non-3GPP accesses (Release 15)," 3GPP TS 23.402 V15.3.0, Mar. 2019, 314 pages.

CATT, "Remaining issues on PDCCH search space," 3GPP TSG RAN WGI Meeting #92bis, R1-1803751, Sanya, China, Apr. 16-20, 2018, 8 pages.

Intel Corporation, "On Rel-15 NR UE feature list," 3GPP TSG-RAN WGI #96bis, R1-1904887, Xi'an, China, Apr. 8-12, 2019, 11 pages.

PCT International Preliminary Report on Patentability in International Appln. No. PCT/US2020/031157, mailed on Nov. 18, 2021, 10 pages.

PCT International Search Report and Written Opinion in International Appln. No. PCT/US2020/031157, mailed on Aug. 17, 2020, 17 pages.

Spreadtrum Communications, "Discussion on PDCCH Enhancements for URLLC," 3GPP TSG RAN WG1 #97, R1-1906357, Reno, USA, May 13-17, 2019, 15 pages.

* cited by examiner

ENHANCED PHYSICAL DOWNLINK CONTROL CHANNEL MONITORING

CROSS-REFERENCE TO RELATED APPLICATION

The present application is a U.S. National Phase application under 35 U.S.C. § 371 of International Patent Application No. PCT/US2020/031157, filed on May 1, 2020, which claims priority to U.S. Provisional Patent Application No. 62/843,287, filed May 3, 2019, the disclosures of each of which are incorporated herein by reference in their entirety.

TECHNICAL FIELD

This disclosure relates generally to physical downlink control channel (PDCCH) monitoring in wireless communications.

BACKGROUND

Wireless communications have evolved significantly from early voice systems to today's highly sophisticated integrated communication platform. The next generation wireless communication system, fifth generation new radio (5G NR), will expand wireless communications to users operating vastly different and sometimes conflicting services and applications. In general, 5G NR will evolve based on the third generation partnership project (3GPP) long term evolution advance (LTE-Advanced) standard with additional potential new radio access technologies (RATs) to improve wireless connectivity solutions.

SUMMARY

In general, in an aspect, a method includes determining a monitoring span for monitoring a physical downlink control channel (PDCCH) within a slot, the monitoring span having a start symbol and a duration that spans one or more symbols within the slot, determining at least one of a maximum number of blind decoding (BD) attempts or a maximum number of control channel elements (CCEs) for channel estimation based on the monitoring span, and monitoring the PDCCH within the monitoring span up to the at least one of the maximum number of BD attempts or the maximum number of CCEs.

In general, in an aspect, a user equipment (UE) device includes one or more processors and memory storing instructions which, when executed by the one or more processors, cause the one or more processors to perform operations including: determining a monitoring span for monitoring a PDCCH within a slot, the monitoring span having a start symbol and a duration that spans one or more symbols within the slot, determining at least one of a maximum number of BD attempts or a maximum number of CCEs for channel estimation based on the monitoring span, and monitoring the PDCCH within the monitoring span up to the at least one of the maximum number of BD attempts or the maximum number of CCEs.

In general, in an aspect, a non-transitory computer readable storage medium storing instructions which, when executed by one or more processors, cause the one or more processors to perform operations including: determining a monitoring span for monitoring a PDCCH within a slot, the monitoring span having a start symbol and a duration that spans one or more symbols within the slot, determining at least one of a maximum number of BD attempts or a maximum number of CCEs for channel estimation based on the monitoring span, and monitoring the PDCCH within the monitoring span up to the at least one of the maximum number of BD attempts or the maximum number of CCEs.

In general, in an aspect, a method includes: determining capability information for a UE including at least one of a maximum number of BD attempts or a maximum number of CCEs for channel estimation, determining one or more monitoring spans for monitoring a PDCCH within a slot based on the capability information, the monitoring span having a start symbol and a duration that spans one or more symbols within the slot, and transmitting at least one of the start symbol or the duration of the monitoring span to the UE.

In general, in an aspect, a base station (BS) includes a transceiver, one or more processors, and memory storing instructions which, when executed by the one or more processors, cause the one or more processors to perform operations including: determining capability information for a UE including at least one of a maximum number of BD attempts or a maximum number of CCEs for channel estimation, determining one or more monitoring spans for monitoring a PDCCH within a slot based on the capability information, the monitoring span having a start symbol and a duration that spans one or more symbols within the slot, and transmitting, by the transceiver, at least one of the start symbol or the duration of the monitoring span to the UE.

In general, in an aspect, a non-transitory computer readable storage medium storing instructions which, when executed by one or more processors, cause the one or more processors to perform operations including: determining capability information for a UE including at least one of a maximum number of BD attempts or a maximum number of CCEs for channel estimation, determining one or more monitoring spans for monitoring a PDCCH within a slot based on the capability information, the monitoring span having a start symbol and a duration that spans one or more symbols within the slot, and transmitting at least one of the start symbol or the duration of the monitoring span to the UE.

Implementations of any of the above aspects can include one or a combination of two or more of the following features.

The start symbol of the monitoring span can be defined relative to a boundary of the slot or relative to a PDCCH monitoring occasion, or both. The duration of the monitoring span can be greater than three symbols. At least one of the start symbol or the duration of the monitoring span can be configured to change across slots. A signal can be received from a base station including an indication of at least one of the start symbol or the duration of the monitoring span. At least one of the start symbol or the duration of the monitoring span can be determined based on a configured Channel Resource Set (CORESET) or search space configuration. A CORESET associated with the PDCCH can be fully contained within the monitoring span. A CORESET associated with the PDCCH can extend beyond the monitoring span, and a first symbol of the CORESET can be within the monitoring span. In some examples, at least one of the maximum number of BD attempts or the maximum number of CCEs are determined by X_total_in_slot/maxNumMaxSpans_in_slot, where X_total_in_slot is a maximum number of available non-overlapping CCEs or BDs and maxNumSpans_in_slot is a maximum number of non-overlapping monitoring spans supported within the slot.

In some examples, a second monitoring span within the slot can be determined, in which the second monitoring span does not overlap with the monitoring span. At least one of a maximum number of BD attempts or a maximum number of CCEs for channel estimation can be determined for the second monitoring span that are different from the at least one of a maximum number of BD attempts or a maximum number of CCEs for channel estimation for the monitoring span. A signal can be transmitted (e.g., by a UE and to a base station) indicating one or more PDCCH monitoring capabilities of the UE, and another signal can be received (e.g., at the UE and from the base station) indicating one or more parameters of the monitoring span, where the one or more parameters are determined based at least in part on the PDCCH monitoring capabilities of the user equipment. One or more PDCCH candidates can be dropped based on the monitoring span. The monitoring span can be truncated when it is determined that the monitoring span extends across a boundary of the slot. The monitoring span can be adjusted in response to an indication of a change in a number of the monitoring occasions within the slot. A PDCCH monitoring search space (e.g., a common search space (CSS) or a user equipment specific search space (UE-SS)) can be constrained based on the at least one of the maximum number of BD attempts or the maximum number of CCEs.

The details of one or more implementations are set forth in the accompanying drawings and the description below. The techniques described here may be implemented by one or more wireless communication systems, components of a wireless communication system (e.g., a user equipment, a base station), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

In 5G NR, a new ultra-reliable low-latency communication (URLLC) category was defined to support emerging services and applications having stringent latency (e.g., 1 ms) and reliability (e.g., 99.999%) requirements. In order to support URLLC services, control and shared channels should employ advanced transmission schemes which maximize diversity and energy within a very short transmission interval. In that sense, reliability of the physical downlink control channel (PDCCH) is critical to provide both downlink and uplink operation. Recently, support of 16 control channel elements (CCEs) per decoding candidate was agreed upon to improve coverage for the considered use cases. However, in order to efficiently support URLLC requirements, further enhancements to 5G NR PDCCH designs should be explored.

The techniques described here provide for enhanced PDCCH monitoring that fits within the existing 5G NR framework. In particular, the present disclosure provides techniques for defining, configuring, indicating, and applying the concept of a monitoring span, as well as its implications in terms of defining the constraints on the number of blind-decodings (BDs) and number of CCEs for channel estimation. In this manner, greater flexibility in terms of monitoring spans and scheduling opportunities is achieved, and PDCCH monitoring is better adapted to different traffic patterns and requirements, such as those corresponding to URLLC services.

Figure 1:
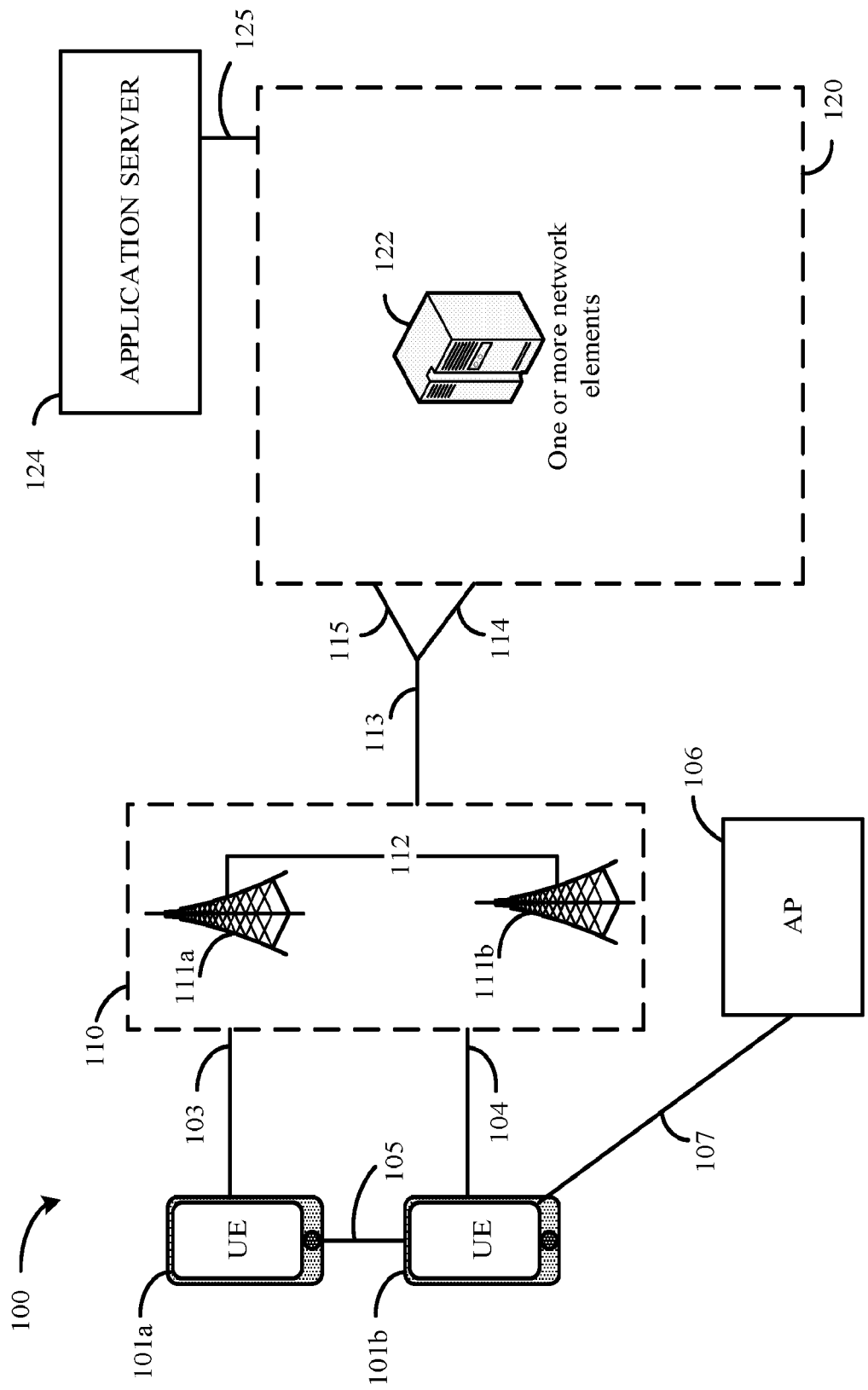
FIG. 1 illustrates an example wireless communication systems.

FIG. 1 illustrates an example wireless communication system 100. For purposes of convenience and without limitation, the example system 100 is described in the context of the LTE and 5G NR communication standards as defined by the 3GPP technical specifications. However, the technology described herein may be implemented in other communication systems using other communication standards, such as other 3GPP standards or IEEE 802.16 protocols (e.g., WMAN or WiMAX), among others.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some examples, the UEs 101 may be narrowband (NB)-IoT UEs 101. NB-IoT provides access to network services using physical layer optimized for very low power consumption (e.g., full carrier BW is 180 kHz, subcarrier spacing can be 3.75 kHz or 15 kHz). A number of E-UTRA functions are not used for NB-IoT and need not be supported by RAN nodes 111 and UEs 101 using only NB-IoT. Examples of such E-UTRA functions may include inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted WLAN interworking, sidelink communication/discovery, MDT, emergency call, CS fallback, and self-configuration/self-optimization, among others. In NB-IoT operation, a UE 101 can use 12 sub-carriers in the downlink with a sub-carrier BW of 15 kHz, and a single sub-carrier in the uplink with a sub-carrier BW of either 3.75 kHz or 15 kHz, or alternatively 3, 6 or 12 sub-carriers with a sub-carrier BW of 15 kHz.

In various examples, the UEs 101 may be MulteFire (MF) UEs 101. MF UEs 101 are LTE-based UEs 101 that operate (exclusively) in unlicensed spectrum. This unlicensed spectrum is defined in MF specifications provided by the MulteFire Forum, and may include, for example, 1.9 GHz (Japan), 3.5 GHz, and 5 GHz. MulteFire is tightly aligned with 3GPP standards and builds on elements of the 3GPP specifications for LAA/eLAA, augmenting standard LTE to operate in global unlicensed spectrum. In some examples, LBT may be implemented to coexist with other unlicensed spectrum networks, such as WiFi, other LAA networks, or the like. In various examples, some or all UEs 101 may be NB-IoT UEs 101 that operate according to MF. In such examples, these UEs 101 may be referred to as "MF NB-IoT UEs 101," however, the term "NB-IoT UE 101" may refer to a "MF UE 101" or a "MF and NB-IoT UE 101" unless stated otherwise. Thus, the terms "NB-IoT UE 101," "MF UE 101," and "MF NB-IoT UE 101" may be used interchangeably throughout the present disclosure.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" or the like may refer to a RAN 110 that operates in a 5G NR system 100, and the term "E-UTRAN" or the like may refer to a RAN 110 that operates in an LTE or 4G system 100, and the term "MF RAN" or the like refers to a RAN 110 that operates in an MF system 100. The UEs 101 utilize connections (or channels) 103 and 104, respectively, each of which comprises a physical communications interface or layer (discussed in further detail below). The connections 103 and 104 may include several different physical DL channels and several different physical UL channels. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein. As examples, the physical UL channels include the PRACH, PUSCH, PUCCH, SPUCCH, NPRACH, NPUSCH, and/or any other physical UL channels mentioned herein.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol; in which the AP 106 would include a wireless fidelity (Wi-Fi®) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs (see, e.g., FIG. 2), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, downlink (DL) and uplink (UL) transmissions may be organized into frames with 10 ms durations, where each frame includes ten 1 ms subframes. A slot duration can be 14 symbols with Normal CP and 12 symbols with Extended CP, and can scale in time as a function of the used sub-carrier spacing so that there is always an integer number of slots in a subframe. In some examples, such as LTE implementations, a DL resource grid can be used for DL transmissions from any of the RAN nodes 111 to the UEs 101, while UL transmissions from the UEs 101 to RAN nodes 111 can utilize a suitable UL resource grid in a similar manner. These resource grids may refer to time-frequency grids, and indicate physical resource in the DL or UL in each slot. Each column and each row of the DL resource grid can correspond to one OFDM symbol and one OFDM subcarrier, respectively, and each column and each row of the UL resource grid can correspond to one SC-FDMA symbol and one SC-FDMA subcarrier, respectively. The duration of the resource grid in the time domain corresponds to one slot in a radio frame. The resource grids comprises a number of resource blocks (RBs), which describe the mapping of certain physical channels to resource elements (REs). In the frequency domain, this may represent the smallest quantity of resources that currently can be allocated. Each RB comprises a collection of REs. An RE is the smallest time-frequency unit in a resource grid. Each RE is uniquely identified by the index pair (k,l) in a slot where k=0, . . . , $N_{RB}^{DL}N_{sc}^{RB}-1$ and l=0, . . . , $N_{symb}^{DL}-1$ are the indices in the frequency and time domains, $a_{k,l}^{(p)}$. An respectively. RE (k,l) on antenna port p corresponds to the complex value $a_{k,l}^{(p)}$. An antenna port is defined such that the channel over which a symbol on the antenna port is conveyed can be inferred from the channel over which another symbol on the same antenna port is conveyed. There is one resource grid per antenna port. The set of antenna ports supported depends on the reference signal configuration in the cell, and these aspects are discussed in more detail in 3GPP TS 36.211, the entire content of which is incorporated herein by reference.

In some examples, such as 5G NR implementations, DL and UL transmissions are organized into frames with 10 ms durations each of which includes ten 1 ms subframes. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 comprising subframes 0-4 and half-frame 1 comprising subframes 5-9. There is one set of frames in the UL and one set of frames in the DL on a carrier. UL frame number i for transmission from the UE shall start $T_{TA}=(N_{TA}+N_{TA,offset})T_c$ before the start of the corresponding downlink frame at the UE where $N_{TA,offset}$ is given by 3GPP TS 38.213. For subcarrier spacing configuration µ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{subframe,\mu}-1\}$ in increasing order within a frame. There are $N_{symb}^{slot}$ consecutive OFDM symbols in a slot where $N_{symb}^{slot}$ depends on the cyclic prefix as given by tables 4.3.2-1 and 4.3.2-2 of 3GPP TS 38.211. The start of slot $n_s^\mu$ in a subframe is aligned in time with the start of OFDM symbol $n_s^\mu N_{symb}^{slot}$ in the same subframe. OFDM symbols in a slot can be classified as 'downlink', 'flexible', or 'uplink', where downlink transmissions only occur in 'downlink' or 'flexible' symbols and the UEs 101 only transmit in 'uplink' or 'flexible' symbols.

For each numerology and carrier, a resource grid of $N_{grid,x}^{size,\mu} S_{sc}^{RB}$ subcarriers and $N_{symb}^{subframe,\mu}$ OFDM symbols is defined, starting at common RB $N_{grid}^{start,\mu}$ indicated by higher-layer signaling. There is one set of resource grids per transmission direction (e.g., uplink or downlink) with the subscript x set to DL for downlink and x set to UL for uplink. There is one resource grid for a given antenna port p, subcarrier spacing configuration µ, and transmission direction (e.g., downlink or uplink).

A RB is defined as $N_{sc}^{RB}=12$ consecutive subcarriers in the frequency domain. Common RBs are numbered from 0 and upwards in the frequency domain for subcarrier spacing configuration µ. The center of subcarrier 0 of common resource block 0 for subcarrier spacing configuration µ coincides with 'point A'. The relation between the common resource block number $n_{CRB}^\mu$ in the frequency domain and resource elements (k, l) for subcarrier spacing configuration µ is given by $$n_{CRB}^\mu = \left\lfloor \frac{k}{N_{sc}^{RB}} \right\rfloor$$

where k is defined relative to point A such that k=0 corresponds to the subcarrier centered around point A. Point A serves as a common reference point for resource block grids and is obtained from offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2; and absoluteFrequencyPointA for all other cases where absoluteFrequencyPointA represents the frequency-location of point A expressed as in ARFCN.

A PRB for subcarrier configuration µ are defined within a BWP and numbered from 0 to $N_{BWP,i}^{size,\mu}-1$ where i is the number of the BWP. The relation between the physical resource block $n_{PRB}^\mu$ in BWPi and the common RB $n_{CRB}^\mu$ is given by $n_{CRB}^\mu = n_{PRB}^\mu + N_{BWP,i}^{start,\mu}$ where $N_{BWP,i}^{start,\mu}$ is the common RB where BWP starts relative to common RB 0. VRBs are defined within a BWP and numbered from 0 to $N_{BWP,i}^{size}-1$ where i is the number of the BWP.

Each element in the resource grid for antenna port p and subcarrier spacing configuration µ is called an RE and is uniquely identified by $(k, l)_{p,\mu}$ where k is the index in the frequency domain and l refers to the symbol position in the time domain relative to some reference point. Resource element $(k, l)_{p,\mu}$ corresponds to a physical resource and the complex value $a_{k,l}^{(p,\mu)}$. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A BWP is a subset of contiguous common resource blocks defined in subclause 4.4.4.3 of 3GPP TS 38.211 for a given numerology $\mu_i$ in BWP i on a given carrier. The starting position $N_{BWP,i}^{start,\mu}$ and the number of resource blocks $N_{BWP,i}^{size,\mu}$ in a BWP shall fulfil $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a BWP is described in clause 12 of 3GPP TS 38.213. The UEs 101 can be configured with up to four BWPs in the DL with a single DL BWP being active at a given time. The UEs 101 are not expected to receive PDSCH, PDCCH, or CSI-RS (except for RRM) outside an active BWP. The UEs 101 can be configured with up to four BWPs in the UL with a single UL BWP being active at a given time. If a UE 101 is configured with a supplementary UL, the UE 101 can be configured with up to four additional BWPs in the supplementary UL with a single supplementary UL BWP being active at a given time. The UEs 101 do not transmit PUSCH or PUCCH outside an active BWP, and for an active cell, the UEs do not transmit SRS outside an active BWP.

A NB is defined as six non-overlapping consecutive PRBs in the frequency domain. The total number of DL NBs in the DL transmission BW configured in the cell is given by $$N_{NB}^{DL} = \left\lfloor \frac{N_{RB}^{DL}}{6} \right\rfloor.$$

The NBs are numbered $n_{NB}=0, \ldots, N_{NB}^{DL}-1$ in order of increasing PRB number where narrowband $n_{NB}$ is comprises PRB indices:

$$\begin{cases} 6n_{NB} + i_0 + i & \text{if } N_{RB}^{UL} \bmod 2 = 0 \\ 6n_{NB} + i_0 + i & \text{if } N_{RB}^{UL} \bmod 2 = 1 \text{ and } n_{NB} < N_{NB}^{UL}/2, \\ 6n_{NB} + i_0 + i + 1 & \text{if } N_{RB}^{UL} \bmod 2 = 1 \text{ and } n_{NB} \geq N_{NB}^{UL}/2 \end{cases}$$

$$i = 0, 1, \ldots 5$$

where $i_0 = \left\lfloor \frac{N_{RB}^{UL}}{2} \right\rfloor - \frac{6N_{NB}^{UL}}{2}.$ If $N_{NB}^{UL} \geq 4$, a wideband is defined as four non-overlapping narrowbands in the frequency domain. The total number of uplink widebands in the uplink transmission bandwidth configured in the cell is given by $$N_{WB}^{UL} = \left\lfloor \frac{N_{NB}^{UL}}{4} \right\rfloor$$

and the widebands are numbered $n_{WB}=0, \ldots, N_{WB}^{UL}-1$ in order of increasing narrowband number where wideband $n_{WB}$ is composed of narrowband indices $4n_{WB}+i$ where i=0, 1, . . . , 3. If $N_{NB}^{UL}<4$, then $N_{WB}^{UL}=1$ and the single wideband is composed of the $N_{NB}^{UL}$ non-overlapping narrowband(s).

There are several different physical channels and physical signals that are conveyed using RBs or individual REs. A physical channel corresponds to a set of REs carrying information originating from higher layers. Physical UL channels may include PUSCH, PUCCH, PRACH, and/or any other physical UL channel(s) discussed herein, and physical DL channels may include PDSCH, PBCH, PDCCH, and/or any other physical DL channel(s) discussed herein. A physical signal is used by the physical layer (e.g., PHY 610 of FIG. 8) but does not carry information originating from higher layers. Physical UL signals may include DMRS, PTRS, SRS, and/or any other physical UL signal(s) discussed herein, and physical DL signals may include DMRS, PTRS, CSI-RS, PSS, SSS, and/or any other physical DL signal(s) discussed herein.

The PDSCH carries user data and higher-layer signaling to the UEs 101. Typically, DL scheduling (assigning control and shared channel resource blocks to the UE 101 within a cell) may be performed at any of the RAN nodes 111 based on channel quality information fed back from any of the UEs 101. The downlink resource assignment information may be sent on the PDCCH used for (e.g., assigned to) each of the UEs 101. The PDCCH uses CCEs to convey control information (e.g., DCI), and a set of CCEs may be referred to a "control region." Control channels are formed by aggregation of one or more CCEs, where different code rates for the control channels are realized by aggregating different numbers of CCEs. The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level, L=1, 2, 4, or 8 in LTE and L=1, 2, 4, 8, or 16 in NR). The UE 101 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of 3GPP TS 38.212, DCI formats 0_0 through 2_3 as discussed in section 7.3 of 3GPP TS 38.212, or the like). The UEs 101 monitor (or attempt to decode) respective sets of PDCCH candidates in one or more configured monitoring occasions according to the corresponding search space configurations. A DCI transports DL, UL, or SL scheduling information, requests for aperiodic CQI reports, LAA common information, notifications of MCCH change, UL power control commands for one cell and/or one RNTI, notification of a group of UEs 101 of a slot format, notification of a group of UEs of the PRB(s) and OFDM symbol(s) where UE may assume no transmission is intended for the UE, TPC commands for PUCCH and PUSCH, and/or TPC commands for PUCCH and PUSCH. The DCI coding steps are discussed in 3GPP TS 38.212, the entire content of which is incorporated herein by reference.

Some examples may use concepts for resource allocation for control channel information that are an extension of the above-described concepts. For example, an EPDCCH that uses PDSCH resources may be used for control information transmission. The EPDCCH may be transmitted using one or more ECCEs. Similar to above, each ECCE may correspond to nine sets of four physical resource elements known as an EREGs. An ECCE may have other numbers of EREGs in some situations.

As alluded to previously, the PDCCH can be used to schedule DL transmissions on PDSCH and UL transmissions on PUSCH, wherein the DCI on PDCCH includes, for example, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission(s) with configured grant; activation and deactivation of PDSCH semi-persistent transmission; notifying one or more UEs 101 of a slot format; notifying one or more UEs 101 of the PRB(s) and OFDM symbol(s) where a UE 101 may assume no transmission is intended for the UE; transmission of TPC commands for PUCCH and PUSCH; transmission of one or more TPC commands for SRS transmissions by one or more UEs 101; switching an active BWP for a UE 101; and initiating a random access procedure, among others.

In NR implementations, the UEs 101 monitor (or attempt to decode) respective sets of PDCCH candidates in one or more configured monitoring occasions in one or more configured Control Resource Sets (CORESETs) according to the corresponding search space configurations. A CORESET may include a set of PRBs with a time duration of 1 to 3 OFDM symbols. A CORESET may additionally or alternatively include $N_{RB}^{CORESET}$ RBs in the frequency domain and $N_{symb}^{CORESET} \in \{1,2,3\}$ symbols in the time domain. A CORESET includes six REGs numbered in increasing order in a time-first manner, wherein an REG equals one RB during one OFDM symbol. The UEs 101 can be configured with multiple CORESETS where each CORESET is associated with one Control Channel Element (CCE) to Resource Element Group (REG) mapping. Interleaved and non-interleaved CCE-to-REG mapping are supported in a CORESET. Each REG carrying a PDCCH carries its own Demodulation Reference Signal (DMRS).

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using license assisted access (LAA), enhanced-LAA (eLAA), or further enhanced-LAA (feLAA) mechanisms. In these implementations, the UEs 101 and the RAN nodes 111 may perform one or more known medium-sensing operations or carrier-sensing operations, or both, to determine whether one or more channels in the unlicensed spectrum are unavailable or otherwise occupied prior to transmitting in the unlicensed spectrum. The medium/carrier sensing operations may be performed according to a listen-before-talk (LBT) protocol. LBT is a mechanism in which equipment (for example, UEs 101, RAN nodes 111) senses a medium (for example, a channel or carrier frequency) and transmits when the medium is sensed to be idle (or when a specific channel in the medium is sensed to be unoccupied). The medium sensing operation may include clear channel assessment (CCA), which uses energy detection to determine the presence or absence of other signals on a channel in order to determine if a channel is occupied or clear. This LBT mechanism allows cellular/LAA networks to coexist with incumbent systems in the unlicensed spectrum and with other LAA networks. Energy detection may include sensing RF energy across an intended transmission band for a period of time and comparing the sensed RF energy to a predefined or configured threshold.

The incumbent systems in the 5 GHz band can be WLANs based on IEEE 802.11 technologies. WLAN employs a contention-based channel access mechanism (e.g., CSMA with collision avoidance (CSMA/CA)). In some examples, when a WLAN node (e.g., a mobile station (MS), such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value as the transmission succeeds. In some examples, the LBT mechanism designed for LAA is similar to the CSMA/CA of WLAN. In some examples, the LBT procedure for DL or UL transmission bursts, including PDSCH or PUSCH transmissions, respectively, may have an LAA contention window that is variable in length between X and Y extended CAA (ECCA) slots, where X and Y are minimum and maximum values for the CWSs for LAA. In one example, the minimum CWS for an LAA transmission may be 9 microseconds (μs); however, the size of the CWS and a maximum channel occupancy time (for example, a transmission burst) may be based on governmental regulatory requirements.

In some examples, the LAA mechanisms are built on carrier aggregation technologies of LTE-Advanced systems. In CA, each aggregated carrier is referred to as a component carrier. In some examples, a component carrier may have a bandwidth of 1.4, 3, 5, 10, 15 or 20 MHz, and a maximum of five component carriers can be aggregated to provide a maximum aggregated bandwidth is 100 MHz. In frequency division duplex (FDD) systems, the number of aggregated carriers can be different for DL and UL. For example, the number of UL component carriers can be equal to or lower than the number of DL component carriers. In some cases, individual component carriers can have a different bandwidth than other component carriers. In time division duplex (TDD) systems, the number of component carriers as well as the bandwidths of each component carrier is usually the same for DL and UL.

Carrier aggregation can also include individual serving cells to provide individual component carriers. The coverage of the serving cells may differ, for example, because component carriers on different frequency bands may experience different path loss. A primary service cell (PCell) may provide a primary component carrier for both UL and DL, and may handle RRC and non-access stratum (NAS) related activities. The other serving cells are referred to as secondary component carriers (SCells), and each SCell may provide an individual secondary component carrier for both UL and DL. The secondary component carriers may be added and removed as required, while changing the primary component carrier may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The RAN nodes 111 are configured to communicate with one another using an interface 112. In examples, such as where the system 100 is an LTE system (e.g., when the core network 120 is an evolved packet core (EPC) network), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some examples, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality. In examples where the system 100 is an MF system (e.g., when CN 120 is an NHCN 120), the interface 112 may be an X2 interface 112. The X2 interface may be defined between two or more RAN nodes 111 (e.g., two or more MF-APs and the like) that connect to NHCN 120, and/or between two MF-APs connecting to NHCN 120. In these examples, the X2 interface may operate in a same or similar manner as discussed previously.

In some examples, such as where the system 100 is a 5G NR system (e.g., when the core network 120 is a 5G core network), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some examples, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some examples, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

Generally, an application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120.

In some examples, the CN 120 may be a 5G core network (referred to as "5GC 120"), and the RAN 110 may be connected with the CN 120 using a next generation interface 113. In some examples, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs).

In some examples, the CN 120 may be an EPC (referred to as "EPC 120" or the like), and the RAN 110 may be connected with the CN 120 using an S1 interface 113. In some examples, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

In examples where the CN 120 is an MF NHCN 120, the one or more network elements 122 may include or operate one or more NH-MMEs, local AAA proxies, NH-GWs, or other like MF NHCN elements. The NH-MME provides similar functionality as an MME in EPC 120. A local AAA proxy is an AAA proxy that is part of an NHN that provides AAA functionalities required for interworking with PSP AAA and 3GPP AAAs. A PSP AAA is an AAA server (or pool of servers) using non-USIM credentials that is associated with a PSP, and may be either internal or external to the NHN, and the 3GPP AAA is discussed in more detail in 3GPP TS 23.402. The NH-GW provides similar functionality as a combined S-GW/P-GW for non-EPC routed PDN connections. For EPC Routed PDN connections, the NHN-GW provides similar functionality as the S-GW discussed previously in interactions with the MF-APs over the S1 interface 113 and is similar to the TWAG in interactions with the PLMN PDN-GWs over the S2a interface. In some examples, the MF APs 111 may connect with the EPC 120 discussed previously. Additionally, the RAN 110 (sometimes referred to as a "MF RAN 110") may be connected with the NHCN 120 via an S1 interface 113. In these embodiments, the S1 interface 113 may be split into two parts, the S1-U interface 114 that carries traffic data between the RAN nodes 111 (e.g., the "MF-APs 111") and the NH-GW, and the S1-MME-N interface 115, which is a signaling interface between the RAN nodes 111 and NH-MMEs. The S1-U interface 114 and the S1-MME-N interface 115 have the same or similar functionality as the S1-U interface 114 and the S1-MME interface 115 of the EPC 120 discussed herein.

Figure 2:
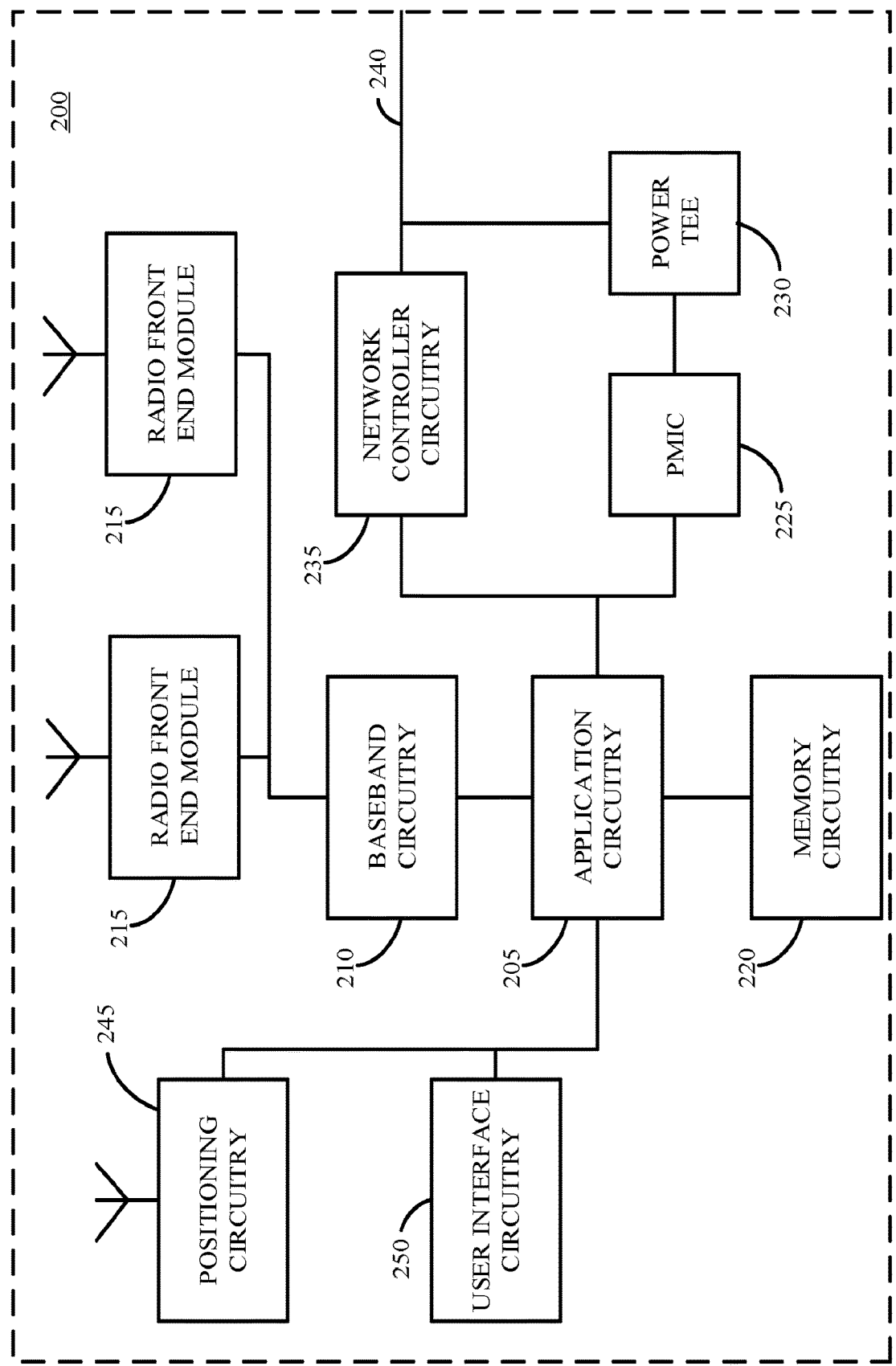
FIG. 2 illustrates an example of infrastructure equipment.

FIG. 2 illustrates an example of infrastructure equipment 200. The infrastructure equipment 200 (or "system 200") may be implemented as a base station, a radio head, a RAN node, such as the RAN nodes 111 or AP 106 shown and described previously, an application server(s) 130, or any other component or device described herein. In other examples, the system 200 can be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and user interface circuitry 250. In some examples, the system 200 may include additional elements such as, for example, memory, storage, a display, a camera, one or more sensors, or an input/output (I/O) interface, or combinations of them, among others. In other examples, the components described with reference to the system 200 may be included in more than one device. For example, the various circuitries may be separately included in more than one device for CRAN, vBBU, or other implementations.

The application circuitry 205 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or TO), memory card controllers such as Secure Digital (SD) MultiMediaCard (MMC) or similar, Universal Serial Bus (USB) interfaces, Mobile Industry Processor Interface (MIDI) interfaces and Joint Test Access Group (JTAG) test access ports. The processors (or cores) of the application circuitry 205 may be coupled with or may include memory or storage elements and may be configured to execute instructions stored in the memory or storage to enable various applications or operating systems to run on the system 200. In some examples, the memory or storage elements may include on-chip memory circuitry, which may include any suitable volatile or non-volatile memory, such as DRAM, SRAM, EPROM, EEPROM, Flash memory, solid-state memory, or combinations of them, among other types of memory.

The processor(s) of the application circuitry 205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some examples, the application circuitry 205 may include, or may be, a special-purpose processor or controller configured to carry out the various techniques described here. As examples, the processor(s) of application circuitry 205 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings. Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some examples, the system 200 may not utilize application circuitry 205, and instead may include a special-purpose processor or controller to process IP data received from an EPC or 5GC, for example.

In some examples, the application circuitry 205 may include one or more hardware accelerators, which may be microprocessors, programmable processing devices, or the like. The one or more hardware accelerators may include, for example, computer vision (CV) or deep learning (DL) accelerators, or both. In some examples, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such implementations, the circuitry of application circuitry 205 may include logic blocks or logic fabric, and other interconnected resources that may be programmed to perform various functions, such as the procedures, methods, functions described herein. In some examples, the circuitry of application circuitry 205 may include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The baseband circuitry 210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 210 are discussed with regard to FIG. 4.

The user interface circuitry 250 may include one or more user interfaces designed to enable user interaction with the system 200 or peripheral component interfaces designed to enable peripheral component interaction with the system 200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces may include, but are not limited to, a nonvolatile memory port, a universal serial bus (USB) port, an audio jack, a power supply interface, among others.

The radio front end modules (RFEMs) 215 may include a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 411 of FIG. 4), and the RFEM may be connected to multiple antennas. In some examples, both mmWave and sub-mmWave radio functions may be implemented in the same physical RFEM 215, which incorporates both mmWave antennas and sub-mmWave.

The memory circuitry 220 may include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. In some examples, the memory circuitry 220 may include three-dimensional (3D) cross-point (XPOINT) memories from Intel® and Micron®. Memory circuitry 220 may be implemented as one or more of solder down packaged integrated circuits, socketed memory modules and plug-in memory cards, for example.

The PMIC 225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 230 may provide for electrical power drawn from a network cable to provide both power supply and data connectivity to the infrastructure equipment 200 using a single cable.

The network controller circuitry 235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 200 using network interface connector 240 using a physical connection, which may be electrical (commonly referred to as a "copper interconnect"), optical, or wireless. The network controller circuitry 235 may include one or more dedicated processors or FPGAs, or both, to communicate using one or more of the aforementioned protocols. In some examples, the network controller circuitry 235 may include multiple controllers to provide connectivity to other networks using the same or different protocols.

The positioning circuitry 245 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 245 can include various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 245 may include a Micro-Technology for Positioning, Navigation, and Timing (Micro-PNT) IC that uses a master timing clock to perform position tracking and estimation without GNSS assistance. The positioning circuitry 245 may also be part of, or interact with, the baseband circuitry 210 or RFEMs 215, or both, to communicate with the nodes and components of the positioning network. The positioning circuitry 245 may also provide data (e.g., position data, time data) to the application circuitry 205, which may use the data to synchronize operations with various infrastructure (e.g., RAN nodes 111).

The components shown by FIG. 2 may communicate with one another using interface circuitry, which may include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system. Other bus or IX systems may be included, such as an I2C interface, an SPI interface, point to point interfaces, and a power bus, among others.

Figure 3:
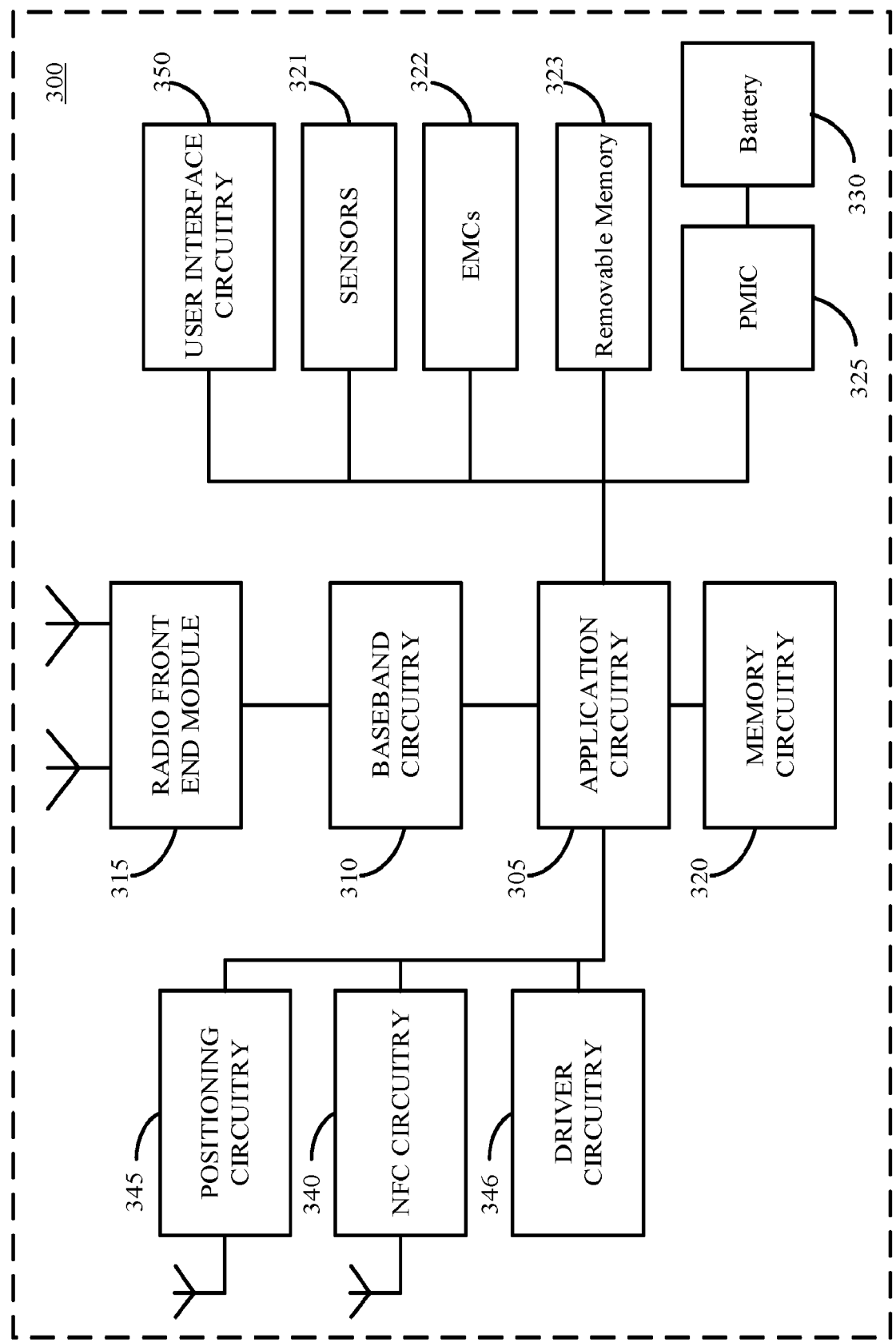
FIG. 3 illustrates an example of a platform or device.

FIG. 3 illustrates an example of a platform 300 (or "device 300"). In some examples, the computer platform 300 may be suitable for use as UEs 101, application servers 130, or any other component or device discussed herein. The platform 300 may include any combinations of the components shown in the example. The components of platform 300 (or portions thereof) may be implemented as integrated circuits (ICs), discrete electronic devices, or other modules, logic, hardware, software, firmware, or a combination of them adapted in the computer platform 300, or as components otherwise incorporated within a chassis of a larger system. The block diagram of FIG. 3 is intended to show a high level view of components of the platform 300. However, in some examples, the platform 300 may include fewer, additional, or alternative components, or a different arrangement of the components shown in FIG. 3.

The application circuitry 305 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 may be coupled with or may include memory/storage elements and may be configured to execute instructions stored in the memory or storage to enable various applications or operating systems to run on the system 300. In some examples, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of application circuitry 205 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the application circuitry 205 may include, or may be, a special-purpose processor/controller to carry out the techniques described herein.

As examples, the processor(s) of application circuitry 305 may include an Apple A-series processor. The processors of the application circuitry 1105 may also be one or more of an Intel® Architecture Core™ based processor, such as a Quark™ an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some examples, the application circuitry 305 may be a part of a system on a chip (SoC) in which the application circuitry 305 and other components are formed into a single integrated circuit, or a single package.

Additionally or alternatively, the application circuitry 305 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the application circuitry 305 may include logic blocks or logic fabric, and other interconnected resources that may be programmed to perform various functions, such as the procedures, methods, functions described herein. In some examples, the application circuitry 305 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 310 are discussed with regard to FIG. 4.

The RFEMs 315 may comprise a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 411 of FIG. 4), and the RFEM may be connected to multiple antennas. In some examples, both mmWave and sub-mmWave radio functions may be implemented in the same physical RFEM 315, which incorporates both mmWave antennas and sub-mmWave.

The memory circuitry 320 may include any number and type of memory devices used to provide for a given amount of system memory. As examples, the memory circuitry 320 may include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. The memory circuitry 320 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, or soldered onto a motherboard using a ball grid array (BGA). In low power implementations, the memory circuitry 320 may be on-die memory or registers associated with the application circuitry 305. To provide for persistent storage of information such as data, applications, operating systems and so forth, memory circuitry 320 may include one or more mass storage devices, which may include, for example, a solid state disk drive (SSDD), hard disk drive (HDD), a micro HDD, resistance change memories, phase change memories, holographic memories, or chemical memories, among others. In some examples, the computer platform 300 may incorporate the three-dimensional (3D) cross-point (XPOINT) memories from Intel® and Micron®.

The removable memory circuitry 323 may include devices, circuitry, enclosures, housings, ports or receptacles, among others, used to couple portable data storage devices with the platform 300. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others.

The platform 300 may also include interface circuitry (not shown) for connecting external devices with the platform 300. The external devices connected to the platform 300 using the interface circuitry include sensor circuitry 321 and electromechanical components (EMCs) 322, as well as removable memory devices coupled to removable memory circuitry 323.

The sensor circuitry 321 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 322 include devices, modules, or subsystems whose purpose is to enable the platform 300 to change its state, position, or orientation, or move or control a mechanism, system, or subsystem. Additionally, the EMCs 322 may be configured to generate and send messages or signaling to other components of the platform 300 to indicate a current state of the EMCs 322. Examples of the EMCs 322 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electromechanical components. In some examples, the platform 300 is configured to operate one or more EMCs 322 based on one or more captured events, instructions, or control signals received from a service provider or clients, or both.

In some examples, the interface circuitry may connect the platform 300 with positioning circuitry 345. The positioning circuitry 345 includes circuitry to receive and decode signals transmitted or broadcasted by a positioning network of a GNSS. Examples of a GNSS include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, among other systems. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 345 may include a Micro-PNT IC that uses a master timing clock to perform position tracking or estimation without GNSS assistance. The positioning circuitry 345 may also be part of, or interact with, the baseband circuitry 210 or RFEMs 315, or both, to communicate with the nodes and components of the positioning network. The positioning circuitry 345 may also provide data (e.g., position data, time data) to the application circuitry 305, which may use the data to synchronize operations with various infrastructure (e.g., radio base stations), for turn-by-turn navigation applications, or the like.

In some examples, the interface circuitry may connect the platform 300 with Near-Field Communication (NFC) circuitry 340. The NFC circuitry 340 is configured to provide contactless, short-range communications based on radio frequency identification (RFID) standards, in which magnetic field induction is used to enable communication between NFC circuitry 340 and NFC-enabled devices external to the platform 300 (e.g., an "NFC touchpoint"). The NFC circuitry 340 includes an NFC controller coupled with an antenna element and a processor coupled with the NFC controller. The NFC controller may be a chip or IC providing NFC functionalities to the NFC circuitry 340 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 340, or initiate data transfer between the NFC circuitry 340 and another active NFC device (e.g., a smartphone or an NFC-enabled POS terminal) that is proximate to the platform 300.

The driver circuitry 346 may include software and hardware elements that operate to control particular devices that are embedded in the platform 300, attached to the platform 300, or otherwise communicatively coupled with the platform 300. The driver circuitry 346 may include individual drivers allowing other components of the platform 300 to interact with or control various input/output (I/O) devices that may be present within, or connected to, the platform 300. For example, the driver circuitry 346 may include a display driver to control and allow access to a display device, a touchscreen driver to control and allow access to a touchscreen interface of the platform 300, sensor drivers to obtain sensor readings of sensor circuitry 321 and control and allow access to sensor circuitry 321, EMC drivers to obtain actuator positions of the EMCs 322 or control and allow access to the EMCs 322, a camera driver to control and allow access to an embedded image capture device, audio drivers to control and allow access to one or more audio devices.

The power management integrated circuitry (PMIC) 325 (also referred to as "power management circuitry 325") may manage power provided to various components of the platform 300. In particular, with respect to the baseband circuitry 310, the PMIC 325 may control power-source selection, voltage scaling, battery charging, or DC-to-DC conversion. The PMIC 325 may be included when the platform 300 is capable of being powered by a battery 330, for example, when the device is included in a UE 101.

In some examples, the PMIC 325 may control, or otherwise be part of, various power saving mechanisms of the platform 300. For example, if the platform 300 is in an RRC_Connected state, where it is still connected to the RAN node as it expects to receive traffic shortly, then it may enter a state known as Discontinuous Reception Mode (DRX) after a period of inactivity. During this state, the platform 300 may power down for brief intervals of time and thus save power. If there is no data traffic activity for an extended period of time, then the platform 300 may transition off to an RRC_Idle state, where it disconnects from the network and does not perform operations such as channel quality feedback or handover. This can allow the platform 300 to enter a very low power state, where it periodically wakes up to listen to the network and then powers down again. In some examples, the platform 300 may not receive data in the RRC_Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 330 may power the platform 300, although in some examples the platform 300 may be deployed in a fixed location, and may have a power supply coupled to an electrical grid. The battery 330 may be a lithium ion battery, a metal-air battery, such as a zinc-air battery, an aluminum-air battery, or a lithium-air battery, among others. In some examples, such as in V2X applications, the battery 330 may be a typical lead-acid automotive battery.

In some examples, the battery 330 may be a "smart battery," which includes or is coupled with a Battery Management System (BMS) or battery monitoring integrated circuitry. The BMS may be included in the platform 300 to track the state of charge (SoCh) of the battery 330. The BMS may be used to monitor other parameters of the battery 330 to provide failure predictions, such as the state of health (SoH) and the state of function (SoF) of the battery 330. The BMS may communicate the information of the battery 330 to the application circuitry 305 or other components of the platform 300. The BMS may also include an analog-to-digital (ADC) convertor that allows the application circuitry 305 to directly monitor the voltage of the battery 330 or the current flow from the battery 330. The battery parameters may be used to determine actions that the platform 300 may perform, such as transmission frequency, network operation, or sensing frequency, among others.

A power block, or other power supply coupled to an electrical grid may be coupled with the BMS to charge the battery 330. In some examples, the power block 330 may be replaced with a wireless power receiver to obtain the power wirelessly, for example, through a loop antenna in the computer platform 300. In these examples, a wireless battery charging circuit may be included in the BMS. The specific charging circuits chosen may depend on the size of the battery 330, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

The user interface circuitry 350 includes various input/output (I/O) devices present within, or connected to, the platform 300, and includes one or more user interfaces designed to enable user interaction with the platform 300 or peripheral component interfaces designed to enable peripheral component interaction with the platform 300. The user interface circuitry 350 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LED displays, quantum dot displays, or projectors), with the output of characters, graphics, or multimedia objects being generated or produced from the operation of the platform 300. The output device circuitry may also include speakers or other audio emitting devices, or printer(s). In some examples, the sensor circuitry 321 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces may include, but are not limited to, a non-volatile memory port, a USB port, an audio jack, or a power supply interface.

Although not shown, the components of platform 300 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 4:
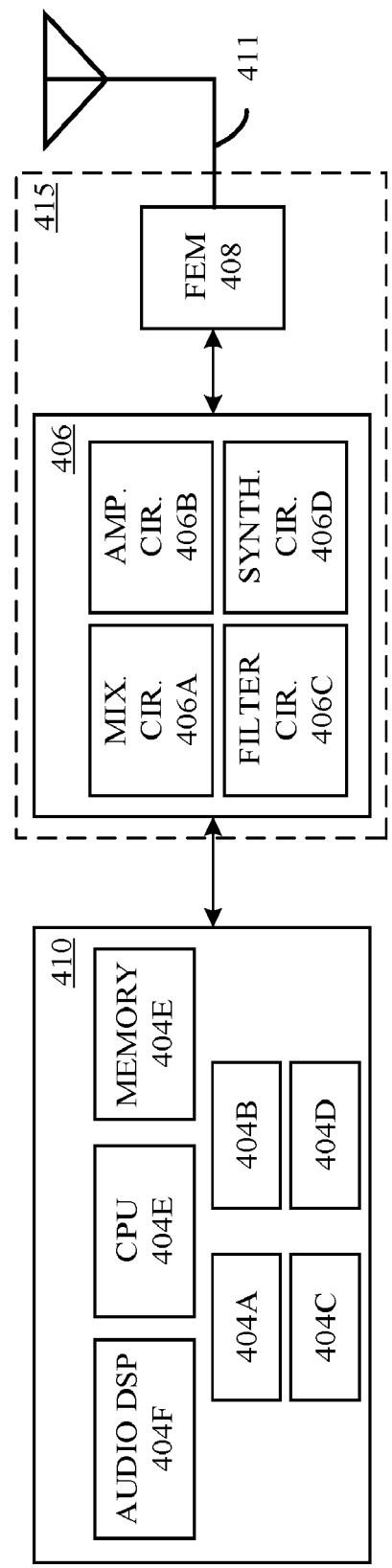
FIG. 4 illustrates example components of baseband circuitry and radio front end circuitry.

FIG. 4 illustrates example components of baseband circuitry 410 and radio front end modules (RFEM) 415. The baseband circuitry 410 can correspond to the baseband circuitry 210 and 310 of FIGS. 2 and 3, respectively. The RFEM 415 can correspond to the RFEM 215 and 315 of FIGS. 2 and 3, respectively. As shown, the RFEMs 415 may include Radio Frequency (RF) circuitry 406, front-end module (FEM) circuitry 408, antenna array 411 coupled together.

The baseband circuitry 410 includes circuitry or control logic, or both, configured to carry out various radio or network protocol and control functions that enable communication with one or more radio networks using the RF circuitry 406. The radio control functions may include, but are not limited to, signal modulation and demodulation, encoding and decoding, and radio frequency shifting. In some examples, modulation and demodulation circuitry of the baseband circuitry 410 may include Fast-Fourier Transform (FFT), precoding, or constellation mapping and demapping functionality. In some examples, encoding and decoding circuitry of the baseband circuitry 410 may include convolution, tail-biting convolution, turbo, Viterbi, or Low Density Parity Check (LDPC) encoder and decoder functionality. Modulation and demodulation and encoder and decoder functionality are not limited to these examples and may include other suitable functionality in other examples. The baseband circuitry 410 is configured to process baseband signals received from a receive signal path of the RF circuitry 406 and to generate baseband signals for a transmit signal path of the RF circuitry 406. The baseband circuitry 410 is configured to interface with application circuitry (e.g., the application circuitry 205, 305 shown in FIGS. 2 and 3) for generation and processing of the baseband signals and for controlling operations of the RF circuitry 406. The baseband circuitry 410 may handle various radio control functions.

The aforementioned circuitry and control logic of the baseband circuitry 410 may include one or more single or multi-core processors. For example, the one or more processors may include a 3G baseband processor 404A, a 4G or LTE baseband processor 404B, a 5G or NR baseband processor 404C, or some other baseband processor(s) 404D for other existing generations, generations in development or to be developed in the future (e.g., sixth generation (6G)). In some examples, some or all of the functionality of baseband processors 404A-D may be included in modules stored in the memory 404G and executed using a Central Processing Unit (CPU) 404E. In some examples, some or all of the functionality of baseband processors 404A-D may be provided as hardware accelerators (e.g., FPGAs or ASICs) loaded with the appropriate bit streams or logic blocks stored in respective memory cells. In some examples, the memory 404G may store program code of a real-time OS (RTOS) which, when executed by the CPU 404E (or other baseband processor), is to cause the CPU 404E (or other baseband processor) to manage resources of the baseband circuitry 410, schedule tasks, or carry out other operations. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 410 includes one or more audio digital signal processor(s) (DSP) 404F. The audio DSP(s) 404F include elements for compression and decompression and echo cancellation and may include other suitable processing elements in some examples.

In some examples, each of the processors 404A-404E include respective memory interfaces to send and receive data to and from the memory 404G. The baseband circuitry 410 may further include one or more interfaces to communicatively couple to other circuitries or devices, such as an interface to send and receive data to and from memory external to the baseband circuitry 410; an application circuitry interface to send and receive data to and from the application circuitry 205, 305 of FIGS. 2 and 3); an RF circuitry interface to send and receive data to and from RF circuitry 406 of FIG. 4; a wireless hardware connectivity interface to send and receive data to and from one or more wireless hardware elements (e.g., Near Field Communication (NFC) components, Bluetooth®/Bluetooth® Low Energy components, Wi-Fi® components, and/or the like); and a power management interface to send and receive power or control signals to and from the PMIC 325.

In some examples (which may be combined with the above described examples), the baseband circuitry 410 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems may include a bus system, point-to-point connections, network-on-chip (NOC) structures, or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, among other components. In some examples, the baseband circuitry 410 may include protocol processing circuitry with one or more instances of control circuitry (not shown) to provide control functions for the digital baseband circuitry or radio frequency circuitry (e.g., the radio front end modules 415).

Although not shown in FIG. 4, in some examples, the baseband circuitry 410 includes individual processing device(s) to operate one or more wireless communication protocols (e.g., a "multi-protocol baseband processor" or "protocol processing circuitry") and individual processing device(s) to implement PHY layer functions. In some examples, the PHY layer functions include the aforementioned radio control functions. In some examples, the protocol processing circuitry operates or implements various protocol layers or entities of one or more wireless communication protocols. For example, the protocol processing circuitry may operate LTE protocol entities or 5G NR protocol entities, or both, when the baseband circuitry 410 or RF circuitry 406, or both, are part of mmWave communication circuitry or some other suitable cellular communication circuitry. In this example, the protocol processing circuitry can operate MAC, RLC, PDCP, SDAP, RRC, and NAS functions. In some examples, the protocol processing circuitry may operate one or more IEEE-based protocols when the baseband circuitry 410 or RF circuitry 406, or both, are part of a Wi-Fi communication system. In this example, the protocol processing circuitry can operate Wi-Fi MAC and logical link control (LLC) functions. The protocol processing circuitry may include one or more memory structures (e.g., 404G) to store program code and data for operating the protocol functions, as well as one or more processing cores to execute the program code and perform various operations using the data. The baseband circuitry 410 may also support radio communications for more than one wireless protocol.

The various hardware elements of the baseband circuitry 410 discussed herein may be implemented, for example, as a solder-down substrate including one or more integrated circuits (ICs), a single packaged IC soldered to a main circuit board or a multi-chip module containing two or more ICs. In some examples, the components of the baseband circuitry 410 may be suitably combined in a single chip or chipset, or disposed on a same circuit board. In some examples, some or all of the constituent components of the baseband circuitry 410 and RF circuitry 406 may be implemented together such as, for example, a system on a chip (SoC) or System-in-Package (SiP). In some examples, some or all of the constituent components of the baseband circuitry 410 may be implemented as a separate SoC that is communicatively coupled with and RF circuitry 406 (or multiple instances of RF circuitry 406). In some examples, some or all of the constituent components of the baseband circuitry 410 and the application circuitry 205, 305 may be implemented together as individual SoCs mounted to a same circuit board (e.g., a "multi-chip package").

In some examples, the baseband circuitry 410 may provide for communication compatible with one or more radio technologies. For example, the baseband circuitry 410 may support communication with an E-UTRAN or other WMAN, a WLAN, or a WPAN. Examples in which the baseband circuitry 410 is configured to support radio communications of more than one wireless protocol may be referred to as multi-mode baseband circuitry.

The RF circuitry 406 may enable communication with wireless networks using modulated electromagnetic radiation through a non-solid medium. In some examples, the RF circuitry 406 may include switches, filters, or amplifiers, among other components, to facilitate the communication with the wireless network. The RF circuitry 406 may include a receive signal path, which may include circuitry to down-convert RF signals received from the FEM circuitry 408 and provide baseband signals to the baseband circuitry 410. The RF circuitry 406 may also include a transmit signal path, which may include circuitry to up-convert baseband signals provided by the baseband circuitry 410 and provide RF output signals to the FEM circuitry 408 for transmission.

The receive signal path of the RF circuitry 406 includes mixer circuitry 406a, amplifier circuitry 406b and filter circuitry 406c. In some examples, the transmit signal path of the RF circuitry 406 may include filter circuitry 406c and mixer circuitry 406a. The RF circuitry 406 also includes synthesizer circuitry 406d for synthesizing a frequency for use by the mixer circuitry 406a of the receive signal path and the transmit signal path. In some examples, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 410 for further processing. In some examples, the output baseband signals may be zero-frequency baseband signals, although this is not a requirement. In some examples, the mixer circuitry 406a of the receive signal path may comprise passive mixers.

In some examples, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 410 and may be filtered by filter circuitry 406c.

In some examples, the mixer circuitry 406a of the receive signal path and the mixer circuitry 406a of the transmit signal path may include two or more mixers and may be arranged for quadrature downconversion and upconversion, respectively. In some examples, the mixer circuitry 406a of the receive signal path and the mixer circuitry 406a of the transmit signal path may include two or more mixers and may be arranged for image rejection (e.g., Hartley image rejection). In some examples, the mixer circuitry 406a of the receive signal path and the mixer circuitry 406a of the transmit signal path may be arranged for direct downconversion and direct upconversion, respectively. In some examples, the mixer circuitry 406a of the receive signal path and the mixer circuitry 406a of the transmit signal path may be configured for super-heterodyne operation.

In some examples, the output baseband signals and the input baseband signals may be analog baseband signals. In some examples, the output baseband signals and the input baseband signals may be digital baseband signals, and the RF circuitry 406 may include analog-to-digital converter (ADC) and digital-to-analog converter (DAC) circuitry and the baseband circuitry 410 may include a digital baseband interface to communicate with the RF circuitry 406.

In some dual-mode examples, a separate radio IC circuitry may be provided for processing signals for each spectrum, although the techniques described here are not limited in this respect.

In some examples, the synthesizer circuitry 406d may be a fractional-N synthesizer or a fractional N/N+1 synthesizer, although other types of frequency synthesizers may be used. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some examples, the synthesizer circuitry 406d may be a fractional N/N+1 synthesizer.

In some examples, frequency input may be provided by a voltage controlled oscillator (VCO), although that is not a requirement. Divider control input may be provided by either the baseband circuitry 410 or the application circuitry 205/305 depending on the desired output frequency. In some examples, a divider control input (e.g., N) may be determined from a look-up table based on a channel indicated by the application circuitry 205, 305.

The synthesizer circuitry 406d of the RF circuitry 406 may include a divider, a delay-locked loop (DLL), a multiplexer and a phase accumulator. In some examples, the divider may be a dual modulus divider (DMD) and the phase accumulator may be a digital phase accumulator (DPA). In some examples, the DMD may be configured to divide the input signal by either N or N+1 (e.g., based on a carry out)

to provide a fractional division ratio. In some examples, the DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some examples, synthesizer circuitry 406*d* may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some examples, the output frequency may be a LO frequency (fLO). In some examples, the RF circuitry 406 may include an IQ or polar converter.

The FEM circuitry 408 may include a receive signal path, which may include circuitry configured to operate on RF signals received from antenna array 411, amplify the received signals and provide the amplified versions of the received signals to the RF circuitry 406 for further processing. The FEM circuitry 408 may also include a transmit signal path, which may include circuitry configured to amplify signals for transmission provided by the RF circuitry 406 for transmission by one or more of antenna elements of antenna array 411. The amplification through the transmit or receive signal paths may be done solely in the RF circuitry 406, solely in the FEM circuitry 408, or in both the RF circuitry 406 and the FEM circuitry 408.

In some examples, the FEM circuitry 408 may include a TX/RX switch to switch between transmit mode and receive mode operation. The FEM circuitry 408 may include a receive signal path and a transmit signal path. The receive signal path of the FEM circuitry 408 may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission by one or more antenna elements of the antenna array 411.

The antenna array 411 comprises one or more antenna elements, each of which is configured convert electrical signals into radio waves to travel through the air and to convert received radio waves into electrical signals. For example, digital baseband signals provided by the baseband circuitry 410 is converted into analog RF signals (e.g., modulated waveform) that will be amplified and transmitted using the antenna elements of the antenna array 411 including one or more antenna elements (not shown). The antenna elements may be omnidirectional, directional, or a combination thereof. The antenna elements may be formed in a multitude of arranges as are known and/or discussed herein. The antenna array 411 may comprise microstrip antennas or printed antennas that are fabricated on the surface of one or more printed circuit boards. The antenna array 411 may be formed as a patch of metal foil (e.g., a patch antenna) in a variety of shapes, and may be coupled with the RF circuitry 406 and/or FEM circuitry 408 using metal transmission lines or the like.

Processors of the application circuitry 205/305 and processors of the baseband circuitry 410 may be used to execute elements of one or more instances of a protocol stack. For example, processors of the baseband circuitry 410, alone or in combination, may be used execute Layer 3, Layer 2, or Layer 1 functionality, while processors of the application circuitry 205, 305 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 5:
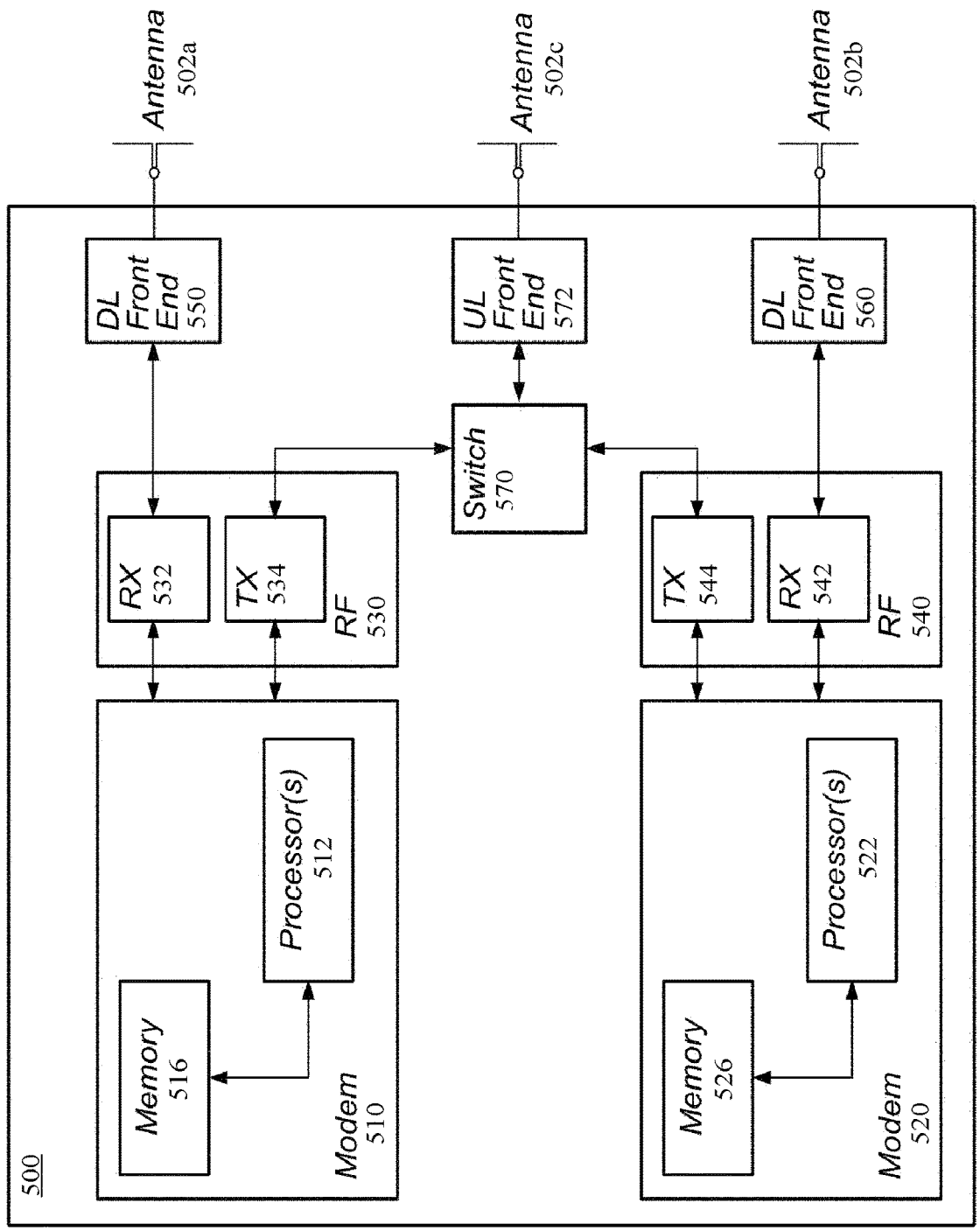
FIG. 5 illustrates example components of cellular communication circuitry.

FIG. 5 illustrates example components of communication circuitry 500. In some examples, the communication circuitry 500 may be implemented as part of the system 200 or the platform 300 shown in FIGS. 2 and 3. The communication circuitry 500 may be communicatively coupled (e.g., directly or indirectly) to one or more antennas, such as antennas 502*a-c*. In some examples, the communication circuitry 500 includes or is communicatively coupled to dedicated receive chains, processors, or radios, or combinations of them, for multiple RATs (e.g., a first receive chain for LTE and a second receive chain for 5G NR). For example, as shown in FIG. 5, the communication circuitry 500 includes a modem 510 and a modem 520, which may correspond to or be a part of the baseband circuitry 210 and 310 of FIGS. 2 and 3. The modem 510 may be configured for communications according to a first RAT, such as LTE or LTE-A, and the modem 520 may be configured for communications according to a second RAT, such as 5G NR.

The modem 510 includes one or more processors 512 and a memory 516 in communication with the processors 512. The modem 510 is in communication with a radio frequency (RF) front end 530, which may correspond to or be a part of to the RFEM 215 and 315 of FIGS. 2 and 3. The RF front end 530 may include circuitry for transmitting and receiving radio signals. For example, the RF front end 530 includes receive circuitry (RX) 532 and transmit circuitry (TX) 534. In some examples, the receive circuitry 532 is in communication with a DL front end 550, which may include circuitry for receiving radio signals from the antenna 502*a*. A switch 570 may selectively couple the modem 510 to an UL front end 572, which may include circuitry for transmitting radio signals using the antenna 502*c*.

Similarly, the modem 520 includes one or more processors 522 and a memory 526 in communication with the processors 522. The modem 520 is in communication with an RF front end 540, which may correspond to or be a part of to the RFEM 215 and 315 of FIGS. 2 and 3. The RF front end 540 may include circuitry for transmitting and receiving radio signals. For example, the RF front end 540 includes receive circuitry 542 and transmit circuitry 544. In some examples, the receive circuitry 542 is in communication with a DL front end 560, which may include circuitry for receiving radio signals from the antenna 502*b*. The switch 570 may selectively couple the modem 520 to the UL front end 572 for transmitting radio signals using the antenna 502*c*.

The modem 510 may include hardware and software components for time division multiplexing UL data (e.g., for NSA NR operations), as well as the various other techniques described herein. The processors 512 may include one or more processing elements configured to implement various features described herein, such as by executing program instructions stored on the memory 516 (e.g., a non-transitory computer-readable memory medium). In some examples, the processor 512 may be configured as a programmable hardware element, such as a FPGA or an ASIC. In some examples, the processors 512 may include one or more ICs that are configured to perform the functions of processors 512. For example, each IC may include circuitry configured to perform the functions of processors 512.

The modem 520 may include hardware and software components for time division multiplexing UL data (e.g., for NSA NR operations), as well as the various other techniques described herein. The processors 522 may include one or more processing elements configured to implement various features described herein, such as by executing instructions stored on the memory 526 (e.g., a non-transitory computer-readable memory medium). In some examples, the processor 522 may be configured as a programmable hardware element, such as a FPGA or an ASIC. In some examples, the processor 522 may include one or more ICs that are configured to perform the functions of processors 522. For example, each IC may include circuitry configured to perform the functions of processors 522.

Figure 6:
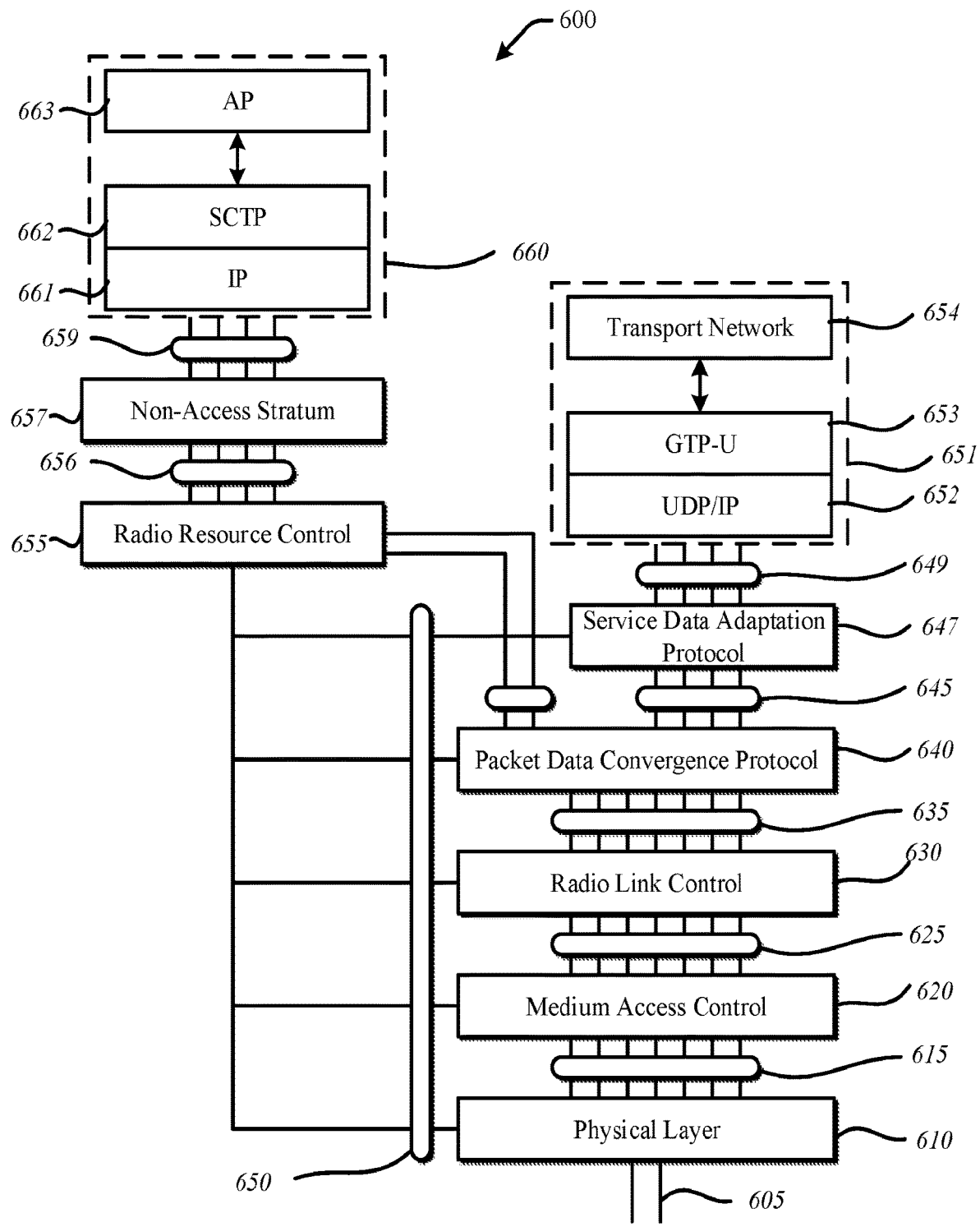
FIG. 6 illustrates example protocol functions that may be implemented in wireless communication systems.

FIG. 6 illustrates various protocol functions that may be implemented in a wireless communication device. In particular, FIG. 6 includes an arrangement 600 showing interconnections between various protocol layers/entities. The following description of FIG. 6 is provided for various protocol layers and entities that operate in conjunction with the 5G NR system standards and the LTE system standards, but some or all of the aspects of FIG. 6 may be applicable to other wireless communication network systems as well.

The protocol layers of arrangement 600 may include one or more of PHY 610, MAC 620, RLC 630, PDCP 640, SDAP 647, RRC 655, and NAS layer 657, in addition to other higher layer functions not illustrated. The protocol layers may include one or more service access points (e.g., items 659, 656, 650, 649, 645, 635, 625, and 615 in FIG. 6) that may provide communication between two or more protocol layers.

The PHY 610 may transmit and receive physical layer signals 605 that may be received from or transmitted to one or more other communication devices. The physical layer signals 605 may include one or more physical channels, such as those discussed herein. The PHY 610 may further perform link adaptation or adaptive modulation and coding (AMC), power control, cell search (e.g., for initial synchronization and handover purposes), and other measurements used by higher layers, such as the RRC 655. The PHY 610 may still further perform error detection on the transport channels, forward error correction (FEC) coding and decoding of the transport channels, modulation and demodulation of physical channels, interleaving, rate matching, mapping onto physical channels, and MIMO antenna processing. In some examples, an instance of PHY 610 may process requests from and provide indications to an instance of MAC 620 using one or more PHY-SAP 615. In some examples, requests and indications communicated using PHY-SAP 615 may comprise one or more transport channels.

Instance(s) of MAC 620 may process requests from, and provide indications to, an instance of RLC 630 using one or more MAC-SAPs 625. These requests and indications communicated using the MAC-SAP 625 may include one or more logical channels. The MAC 620 may perform mapping between the logical channels and transport channels, multiplexing of MAC SDUs from one or more logical channels onto transport blocks (TBs) to be delivered to PHY 610 using the transport channels, de-multiplexing MAC SDUs to one or more logical channels from TBs delivered from the PHY 610 using transport channels, multiplexing MAC SDUs onto TBs, scheduling information reporting, error correction through HARQ, and logical channel prioritization.

Instance(s) of RLC 630 may process requests from and provide indications to an instance of PDCP 640 using one or more radio link control service access points (RLC-SAP) 635. These requests and indications communicated using RLC-SAP 635 may include one or more RLC channels. The RLC 630 may operate in a plurality of modes of operation, including: Transparent Mode (TM), Unacknowledged Mode (UM), and Acknowledged Mode (AM). The RLC 630 may execute transfer of upper layer protocol data units (PDUs), error correction through automatic repeat request (ARQ) for AM data transfers, and concatenation, segmentation and reassembly of RLC SDUs for UM and AM data transfers. The RLC 630 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 640 may process requests from and provide indications to instance(s) of RRC 655 or instance(s) of SDAP 647, or both, using one or more packet data convergence protocol service access points (PDCP-SAP) 645. These requests and indications communicated using PDCP-SAP 645 may include one or more radio bearers. The PDCP 640 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 647 may process requests from and provide indications to one or more higher layer protocol entities using one or more SDAP-SAP 649. These requests and indications communicated using SDAP-SAP 649 may include one or more QoS flows. The SDAP 647 may map QoS flows to data radio bearers (DRBs), and vice versa, and may also mark QoS flow identifiers (QFIs) in DL and UL packets. A single SDAP entity 647 may be configured for an individual PDU session. In the UL direction, the NG-RAN 110 may control the mapping of QoS Flows to DRB(s) in two different ways, reflective mapping or explicit mapping. For reflective mapping, the SDAP 647 of a UE 101 may monitor the QFIs of the DL packets for each DRB, and may apply the same mapping for packets flowing in the UL direction. For a DRB, the SDAP 647 of the UE 101 may map the UL packets belonging to the QoS flows(s) corresponding to the QoS flow ID(s) and PDU session observed in the DL packets for that DRB. To enable reflective mapping, the NG-RAN may mark DL packets over the Uu interface with a QoS flow ID. The explicit mapping may involve the RRC 655 configuring the SDAP 647 with an explicit QoS flow to DRB mapping rule, which may be stored and followed by the SDAP 647. In some examples, the SDAP 647 may only be used in NR implementations and may not be used in LTE implementations.

The RRC 655 may configure, using one or more management service access points (M-SAP), aspects of one or more protocol layers, which may include one or more instances of PHY 610, MAC 620, RLC 630, PDCP 640 and SDAP 647. In some examples, an instance of RRC 655 may process requests from and provide indications to one or more NAS entities 657 using one or more RRC-SAPs 656. The main services and functions of the RRC 655 may include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 657 may form the highest stratum of the control plane between the UE 101 and the AMF. The NAS 657 may support the mobility of the UEs 101 and the session management procedures to establish and maintain IP connectivity between the UE 101 and a P-GW in LTE systems.

In some examples, one or more protocol entities of arrangement 600 may be implemented in UEs 101, RAN nodes 111, AMF in NR implementations or MME in LTE implementations, UPF in NR implementations or S-GW and P-GW in LTE implementations, or the like to be used for control plane or user plane communications protocol stack between the aforementioned devices. In some examples, one or more protocol entities that may be implemented in one or more of UE 101, gNB 111, AMF, among others, may communicate with a respective peer protocol entity that may be implemented in or on another device using the services of respective lower layer protocol entities to perform such communication. In some examples, a gNB-CU of the gNB 111 may host the RRC 655, SDAP 647, and PDCP 640 of the gNB that controls the operation of one or more gNB-DUs, and the gNB-DUs of the gNB 111 may each host the RLC 630, MAC 620, and PHY 810 of the gNB 111.

In some examples, a control plane protocol stack may include, in order from highest layer to lowest layer, NAS 857, RRC 855, PDCP 640, RLC 630, MAC 820, and PHY 810. In this example, upper layers 660 may be built on top of the NAS 857, which includes an IP layer 661, an SCTP 662, and an application layer signaling protocol (AP) 663.

In some examples, such as NR implementations, the AP 663 may be an NG application protocol layer (NGAP or NG-AP) 663 for the NG interface 113 defined between the NG-RAN node 111 and the AMF, or the AP 663 may be an Xn application protocol layer (XnAP or Xn-AP) 663 for the Xn interface 112 that is defined between two or more RAN nodes 111.

The NG-AP 663 may support the functions of the NG interface 113 and may comprise elementary procedures (EPs). An NG-AP EP may be a unit of interaction between the NG-RAN node 111 and the AMF. The NG-AP 663 services may include two groups: UE-associated services (e.g., services related to a UE 101) and non-UE-associated services (e.g., services related to the whole NG interface instance between the NG-RAN node 111 and AMF). These services may include functions such as, but not limited to: a paging function for the sending of paging requests to NG-RAN nodes 111 involved in a particular paging area; a UE context management function for allowing the AMF to establish, modify, or release a UE context in the AMF and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF; a NAS node selection function for determining an association between the AMF and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 663 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 663 may be an S1 Application Protocol layer (S1-AP) 663 for the S1 interface 113 defined between an E-UTRAN node 111 and an MME, or the AP 663 may be an X2 application protocol layer (X2AP or X2-AP) 663 for the X2 interface 112 that is defined between two or more E-UTRAN nodes 111.

The S1 Application Protocol layer (S1-AP) 663 may support the functions of the S1 interface, and similar to the NG-AP discussed previously, the S1-AP may include S1-AP EPs. An S1-AP EP may be a unit of interaction between the E-UTRAN node 111 and an MME within an LTE CN 120. The S1-AP 663 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 663 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 662 may provide guaranteed delivery of application layer messages (e.g., NGAP or XnAP messages in NR implementations, or S1-AP or X2AP messages in LTE implementations). The SCTP 662 may ensure reliable delivery of signaling messages between the RAN node 111 and the AMF/MME based in part on the IP protocol, supported by the IP 661. The Internet Protocol layer (IP) 661 may be used to perform packet addressing and routing functionality. In some implementations the IP layer 661 may use point-to-point transmission to deliver and convey PDUs. In this regard, the RAN node 111 may include L2 and L1 layer communication links (e.g., wired or wireless) with the MME/AMF to exchange information.

In some examples, a user plane protocol stack may include, in order from highest layer to lowest layer, SDAP 647, PDCP 640, RLC 630, MAC 820, and PHY 810. The user plane protocol stack may be used for communication between the UE 101, the RAN node 111, and UPF 302 in NR implementations or an S-GW and P-GW in LTE implementations. In this example, upper layers 651 may be built on top of the SDAP 647, and may include a user datagram protocol (UDP) and IP security layer (UDP/IP) 652, a General Packet Radio Service (GPRS) Tunneling Protocol for the user plane layer (GTP-U) 653, and a User Plane PDU layer (UP PDU) 663.

The transport network layer 654 (also referred to as a "transport layer") may be built on IP transport, and the GTP-U 653 may be used on top of the UDP/IP layer 652 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 653 may be used for carrying user data within the GPRS core network and between the radio access network and the core network. The user data transported can be packets in any of IPv4, IPv6, or PPP formats, for example. The UDP/IP 652 may provide checksums for data integrity, port numbers for addressing different functions at the source and destination, and encryption and authentication on the selected data flows. The RAN node 111 and the S-GW may utilize an S1-U interface to exchange user plane data using a protocol stack comprising an L1 layer (e.g., PHY 610), an L2 layer (e.g., MAC 620, RLC 630, PDCP 640, and/or SDAP 647), the UDP/IP layer 652, and the GTP-U 653. The S-GW and the P-GW may utilize an S5/S8a interface to exchange user plane data using a protocol stack comprising an L1 layer, an L2 layer, the UDP/IP layer 652, and the GTP-U 653. As discussed previously, NAS protocols may support the mobility of the UE 101 and the session management procedures to establish and maintain IP connectivity between the UE 101 and the P-GW.

Moreover, although not shown by FIG. 6, an application layer may be present above the AP 663 and/or the transport network layer 654. The application layer may be a layer in which a user of the UE 101, RAN node 111, or other network element interacts with software applications being executed, for example, by application circuitry 205 or application circuitry 305, respectively. The application layer may also provide one or more interfaces for software applications to interact with communications systems of the UE 101 or RAN node 111, such as the baseband circuitry 410. In some examples, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 7:
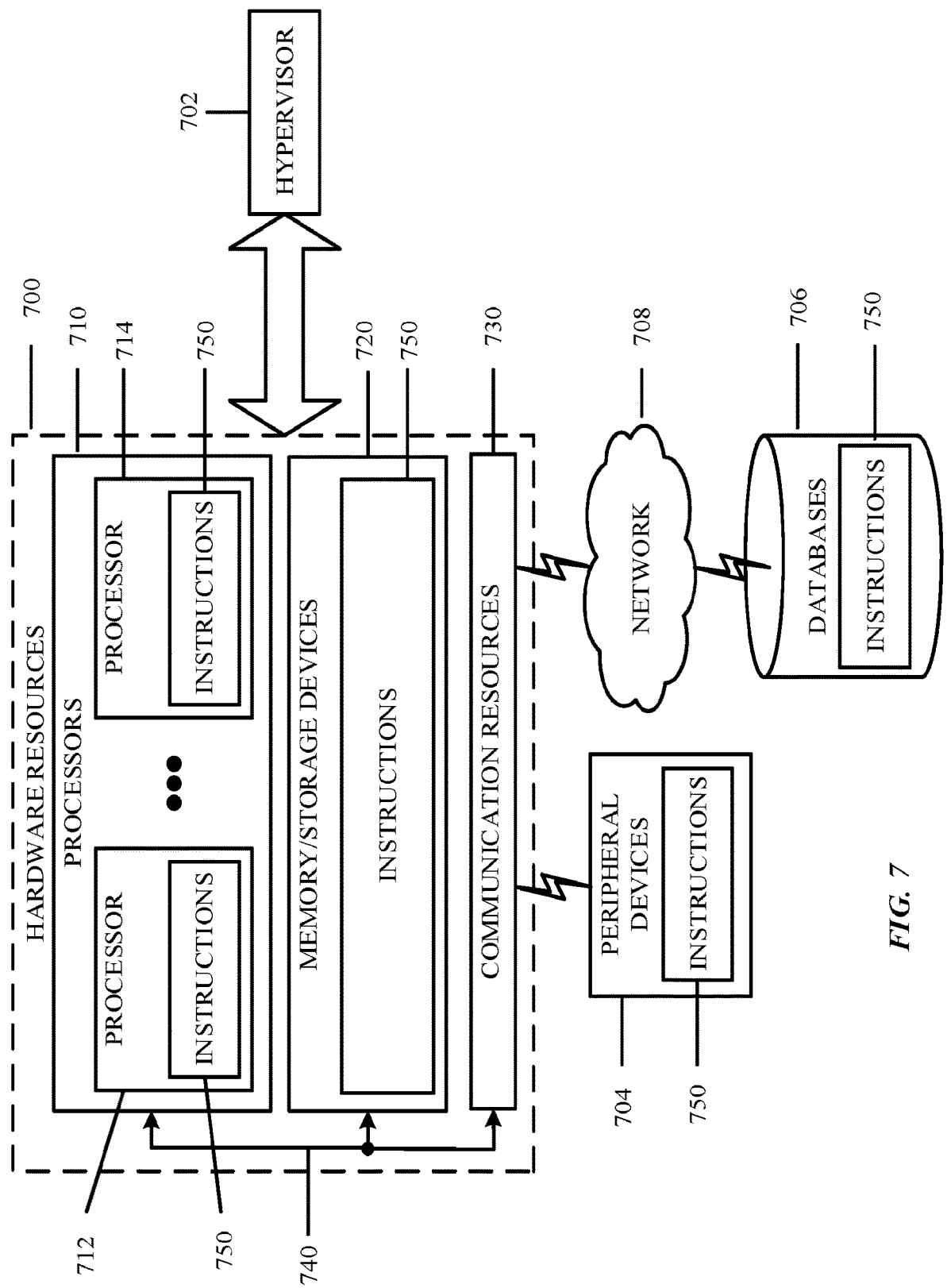
FIG. 7 illustrates an example computer system.

FIG. 7 is a block diagram illustrating components for reading instructions from a machine-readable or computer-readable medium (e.g., a non-transitory machine-readable storage medium) and performing any one or more of the techniques described herein. Specifically, FIG. 7 shows a diagrammatic representation of hardware resources 700 including one or more processors (or processor cores) 710, one or more memory or storage devices 720, and one or more communication resources 730, each of which may be communicatively coupled using a bus 740. For implementations where node virtualization (e.g., NFV) is utilized, a hypervisor 702 may be executed to provide an execution environment for one or more network slices or sub-slices to utilize the hardware resources 700.

The processors 710 may include a processor 712 and a processor 714. The processor(s) 710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 720 may include main memory, disk storage, or any suitable combination thereof. The memory/storage devices 720 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 730 may include interconnection or network interface components or other suitable devices to communicate with one or more peripheral devices 704 or one or more databases 706 using a network 708. For example, the communication resources 730 may include wired communication components (e.g., for coupling using USB), cellular communication components, NFC components, Bluetooth® (or Bluetooth® Low Energy) components, Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

In 5G NR, the PDCCH monitoring periodicity is defined through two levels of configuration: the search space monitoring periodicity defined in terms of the number of slots, as well as the monitoring occasions defined in terms of the symbols within slots. In particular, the parameter "monitoringSlotPeriodicityAndOffset" is defined within the PDCCH search space set configurations to configure the PDCCH monitoring periodicity and the offset at the slot-level. Further, the parameter "monitoredSymbolsWithinSlot" is defined to configure the PDCCH monitoring pattern within a slot, indicating the first symbol of the CORESET. Each configured search space with a certain monitoring periodicity in terms of slots and starting symbols within the monitored slots is associated with a CORESET. Thus, the concept of PDCCH monitoring periodicity is defined per search space set and is not configured at the CORESET-level.

Figure 8:
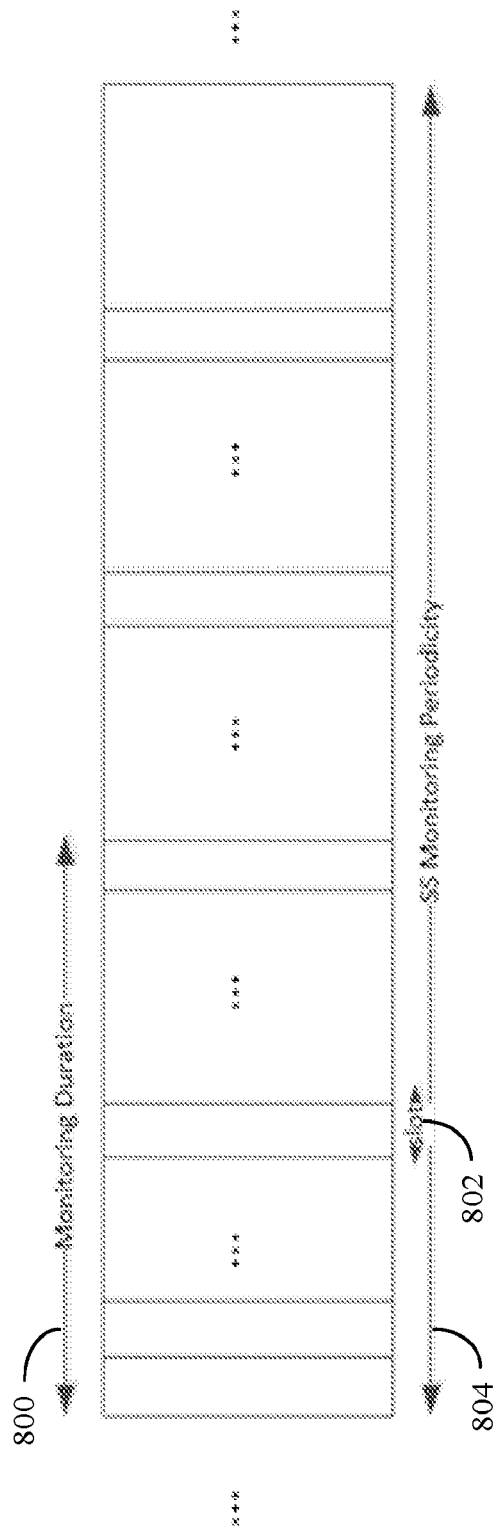
FIG. 8 illustrates an example of physical downlink control channel (PDCCH) monitoring duration.

The concept of monitoring duration has also been introduced to the search space. As shown in FIG. 8, the monitoring duration 800 indicates the number of consecutive slots 802 over which the one or more monitoring occasions for the corresponding PDCCH common search space (CSS) occur. The length of the monitoring duration is configured by RRC and can range from one slot up to (ks−1) slots, where ks is the search space monitoring periodicity 804. In other words, the monitoring duration 800 defines the number of slots that a search space lasts during each period (e.g., the period defined in the monitoringSlotPeriodicityAndOffset). When the monitoring duration 800 has expired for a particular period 804, the UE does not monitor the PDCCH for the corresponding search space set for the next (ks−monitoring duration) consecutive slots. This configuration allows for bursts and gaps of monitoring, in terms of number of subsequent slots, all the way up to the search space monitoring periodicity 804. In this manner, the monitoring duration forms a configurable window that can be widened to increase the duration of the PDCCH monitoring time in non-contiguous bursts to cater to bursty traffic profiles while enabling a trade-off against UE power consumption via use of larger monitoring periodicity values.

Multiple PDCCH monitoring occasions within a slot may be supported (in addition to the PDCCH monitoring occasion(s) defined in the first three symbols of a slot) as an optional UE capability, as defined in Feature Group 3-5b in 3GPP TS 38.306 and 38.822. A minimum time separation of X OFDM symbols may be included between the start of two spans, where each span is up to Y consecutive OFDM symbols in length during which PDCCH is configured to be monitored. Further, certain DCIS can be processed for the set of monitoring occasions which are within the same span, with limitations on the number of different start symbol indices of spans for all PDCCH monitoring occasions per slot, and the number of PDCCH monitoring occasions per slot. As such, the UE may also be configured with multiple monitoring occasions beyond the first 3 symbols. Further, the layer-one control information to be handled can include parallel triggering for unicast data transmission (e.g., PDSCHs or PUSCHs), as well as common control and broadcast with the group PDCCHs.

By capping the number of PDCCHs that the UE may expect within a slot duration, the UE processing load for PDCCH monitoring over a slot can be controlled. As such, the concept of monitoring span and span gap have been developed, referring to certain monitoring opportunities where the UE is configured to monitor for PDCCH(s).

In this regard, the UE can indicate its capability to monitor for PDCCH multiple times within a slot, although it may require a gap of at least a certain number of symbols between the monitoring times in some examples. This capability imposes certain scheduling constraints and is largely based on how the UE's firmware can handle the control flow (e.g., in terms of receiving grants, and being able to perform the subsequent processing). As discussed above, such a capability definition places a cap on the UE processing load, since otherwise the UE may need to handle control information flow arriving at any and every time within the slot.

Ultra-reliable low-latency communication (URLLC) services introduce new requirements, traffic profiles, and scheduling characteristics to PDCCH monitoring. Accordingly, it may be useful to enhance PDCCH monitoring (e.g., to achieve greater flexibility in scheduling opportunities, among other enhancements) in order to adapt to such requirements, profiles, and characteristics, as there are use cases supported in 3GPP Release 16 for which the 3GPP Release 15 requirements may not be adequate. Certainly, increasing the number of blind decodings (BDs) or CCEs for channel estimation can improve scheduling flexibility. However, these enhancements also increase UE complexity and power consumption. The UE needs to dimension the control processing in terms of potential PDCCH monitoring enhancements (e.g., in terms of the maximum numbers of BDs/CCEs for channel estimation). Thus, an optimal balance between improved scheduling flexibility and blocking performance and increased UE complexity and power consumption should be determined.

Note that, for convenience and compact presentation, the term "BDs/CCEs" is used herein to refer to "numbers of BDs and/or numbers of non-overlapping CCEs." However, the term does not necessarily imply that the requirements on the number of BDs and the number of non-overlapping CCEs may be enhanced simultaneously or using the same techniques.

Requirements on Maximum Number of BDs/Non-Overlapping CCEs:

In future releases of the 5G NR specifications, limitations on the maximum number of BDs/CCEs over shorter PDCCH monitoring durations than a slot may be expressly defined. For example, the duration of a monitoring occasion or monitoring span, or both, may be considered as the reference scale. As noted above, in 3GPP Release 15, UE capability developments (e.g., defined in Feature Group 3-5b in 3GPP TS 38.306 and 38.822) did not consider aspects related to the maximum number of BDs/CCEs for channel estimation, and such characterizations are defined on a per slot basis (e.g., there is no relationship with respect to shorter durations like the monitoring span).

The present disclosure provides techniques for defining, configuring, indicating, and applying the concept of monitoring span, as well as its implications in terms of defining the constraints on the number of blind-decoding and number of CCEs for channel estimation. The "monitoring span," as used herein, does not necessarily reuse what is defined in 3GPP Release 15, since the BD/CCE characterization imposes a different problem compared to PDCCH monitoring characterization per Feature Group 3-5b in 3GPP TS 38.306 and 38.822.

Unless otherwise noted, the PDCCH monitoring enhancements described here are applicable to different duplex systems, such as FDD, TDD, bandwidth parts with different numerologies (e.g., 15 kHz, 30 kHz, 60 kHz, 120 kHz, etc.), licensed and unlicensed spectrum access, among others.

Monitoring Span for Defining BD/CCE Requirements—Definition, Duration, Configuration, and Indication:

Each monitoring span can be considered to have a length of up to Y consecutive OFDM symbols in which PDCCH may be configured to be monitored. In an example, all PDCCHs that are associated with a span are fully contained within that span, and every PDCCH being monitored is also part of a span.

There are different options to realize the start symbol and duration of a span, as well as the start and duration of the PDCCHs associated with a span. In some examples, the start and duration of the PDCCHs associated with a span are determined per the applicable CORESET and search space configuration. Further, to avoid ambiguity when a PDCCH may belong to more than one span (e.g., if a PDCCH is fully contained in more than one span), the PDCCH is considered as part of the span that has the smallest start symbol index among the spans fully containing the PDCCH.

In some examples, the monitoring span(s) are defined with respect to the slot boundary, such as every m symbols to or from the slot boundary, where m can be any value less than the number of symbols in a slot (e.g., 14). The parameter m can be defined with or without a certain gap between the start of two consecutive spans. In one example, m is equal to 2 or 3. However, such a definition may impose restrictions on potential starting symbols for PDCCH monitoring occasions, possible combinations of CORESET durations, and their starting points. There may also exist issues with orphan symbols which do not fit in a span of a certain duration, or cases wherein a CORESET crosses span boundaries, among others.

In some examples, every $m^{th}$ symbol can be marked as a potential span starting position. In some examples, the first potential starting position without any PDCCH monitoring may trigger an override of such rule. Upon such triggering, m can be reduced by a certain value, and new potential starting positions can be marked.

In some examples, the spans may be defined with respect to PDCCH monitoring occasions (e.g., the start of PDCCH monitoring occasions). Accordingly, the first symbol of a span can correspond to a symbol in which the UE is configured to monitor a PDCCH. In one example, the starting symbol of the span is defined to align with a starting symbol of a PDCCH monitoring occasion for which a UE is configured. Such a configuration allows a span to include symbols in which PDCCH is not monitored. For instance, for a span having a duration of 3 symbols, it is possible to have a configuration like 'M0M,' where 'M' means monitoring of a one-symbol CORESET, and '0' means no PDCCH monitoring in the symbol. Further, in some examples, the maximum number of spans within a slot duration can be specified on a per-SCS basis, or configured to the UE via higher layers, or reported by the UE as UE capability information. In some examples, the UE may indicate (e.g., based on its capabilities) the maximum span duration and the corresponding minimum gap (as a number of OFDM symbols) between starting symbols of two consecutive spans.

Note that spans, when used to characterize BD/CCE requirements, should not be overlapping, although "candidate spans" that could be used as intermediate steps to determine the final assignment of spans based on actual configuration of PDCCH monitoring (e.g., configured PDCCH search space sets and their monitoring occasions (MOs)) may overlap. However, if the assigned spans are constrained to not overlap, and if all PDCCHs that are associated with a span are fully contained within that span, then the resulting set of constraints may be overly restrictive with respect to candidate PDCCH locations within the slot (and may approach the case where spans are defined based on slot boundary and symbol indices). Thus, to alleviate such restrictions, in some examples a PDCCH CORESET may map beyond a span so long as the first symbol of the CORESET (corresponding to the configured MO for the search space set mapped to the CORESET) is contained within the span of Y symbols and the PDCCH does not cross the slot boundary. Then, the numbers of BDs/CCEs corresponding to such a PDCCH MO are counted as part of the span that contains the first symbol of the CORESET (e.g., the symbol corresponding to the MO).

In some examples, the UE is configured with a span duration via higher layer signaling. In some examples, such a configuration is based on the SCS of the DL BWP. Other alternatives include having the gNB (or another base station) configure some candidate set(s) of span starting positions and span duration values to be down-selected from by the UE. In some examples, default values may be set (e.g., including back-to-back spans partitioning the whole slot).

As discussed above, there is a trade-off between the overall UE dimensioning (if these requirements are translated back to the slot-level scale), and the effectiveness in typical URLLC-type scheduling where only a few monitoring candidates may be needed, which may be distributed over the slot duration. Thus, the new capability characterization may efficiently accommodate use cases with non-uniform and "triggered" monitoring occasions, which can be implemented using the flexible span configurations described here. In some examples, gNB configuration of span parameters or higher-layer signaling to the UE, or both, can enable handling of dynamically triggered DCI monitoring.

In some examples, the maximum duration of a span may be fixed at certain number of OFDM symbols (e.g., in a 3GPP specification). In one example, the maximum span length can be specified as 3 OFDM symbols, as all 5G NR-compliant UEs are able to receive PDCCHs over the first three symbols of the slot.

New Definition of BD/CCE Requirements and Constraints:

It is possible to define the requirements on the number of BDs/CCEs in terms of the monitoring spans. Although such an approach may increase the total number of non-overlapping CCEs (and/or BDs) per slot, a cap can then be defined on what the UE may expect per a certain number of symbols by defining the requirements on a number of CCEs (and/or BDs) over the determined duration. This approach limits the total number of Layer-1 control information messages that the UE needs to handle at a time, or over a certain period of time, in terms of the number of CCEs/BDs.

In one example, the aforementioned spans used for defining the BDs/CCEs requirements can follow the definitions described here. In another example, the span definition may follow that of 3GPP Release 15.

In some examples, the requirements can be defined based on the PDCCH monitoring spans and span-gaps following 3GPP Release 15, with potential enhancements to the span and span-gap definitions. Some potential enhancements to Release 15 definition (e.g., adaptation/update of the definition of span/span separation in the context of PDCCH monitoring enhancements for URLLC) include the following:

In one example, the restriction in Release 15 that the span pattern be identical in each slot may be relaxed to allow more scheduling flexibility, such that the span pattern may be different across slots. However, in some examples, spans may still not be allowed to cross slot boundaries.

In some examples, the maximum possible duration for a PDCCH monitoring span may be extended to values beyond 2 or 3 symbols. Specifically, new span duration values may include one or more of 1, 4, 6, or 7 symbols. The minimum numbers of BDs/CCEs may be different for different span durations or may be different for each choice of maximum duration, but the same value may apply for a UE given a maximum span duration.

In another example, defining the span and span gaps may have greater flexibility, such that PDCCH is allowed to cross span-boundaries. In such a case, if a span of duration N symbols straddles the slot boundary with n<N symbols in slot i, then the span is effectively truncated to n symbols and any PDCCH to be monitored within such a span shall also be mapped to CORESETs with a duration no longer than n symbols.

In some examples, the span definition may be updated via higher layers, MAC CE signaling, or DCI signaling, among others, to better accommodate the variations of monitoring occasions across slots. Such a semi-static or dynamic update may depend on how frequent the spans contain any monitoring occasions and/or the number of monitoring occasions in a span. In some examples, overriding rules can be defined in terms of span restrictions. For instance, if in two or more consecutive slots some of the spans do not contain any monitoring occasions, then a less restrictive span determination is considered.

In another example, PDCCH monitoring enhancements are defined per certain number(s) of symbols. This can also be considered a special case of span definition. In general, overall characterization may include one or a combination of two or more of slot-level, half-slot-level, span-level, and symbol-level monitoring requirements. Thus, PDCCH monitoring requirements for numbers of BDs/CCEs may be defined simultaneously for more than one duration in numbers of OFDM symbols. For example, the UE may be required to be at least capable of a minimum required numbers of BDs/CCEs over a corresponding span duration as well as a minimum required numbers of BDs/CCEs over one or more of: 1-symbol duration, slot-duration.

Co-Existence with the Current Requirements:

When defining the BDs/CCEs requirements over a shorter duration than a slot (e.g., over monitoring span, monitoring occasions, etc.), it is important to consider how the new constraints co-exist with preexisting slot-level constraints.

In some examples, the slot-level constraints are overwritten once the newer constraints (as described here) are configured. In another example, a UE can indicate its capability, and a predefined mapping between the capability and the requirements can be used to determine the appropriate constraints. For example, since the UE is able indicate its capabilities together with the span duration and span gaps under Release 15, such an indication from the UE can also be used to indicate the overall characterization of number of BDs/CCEs. This capability signaling can be extended such that the UE may also report its capability of handling a maximum number of BDs/CCEs over each span or over the entire slot duration, or both. For the latter option, in some examples, the capability can be indicated in a way similar to the BDs/CCEs scaling for carrier aggregation (CA) scenarios in which the UE indicates one or more multiplicative factor(s) (e.g., one for each of the BDs and CCEs) of the slot-level nominal values of BDs/CCEs from Release 15, defined on a per-numerology basis. Then, the per-span BDs/CCEs limits can be determined as X_total_in_slot/ maxNumMaxSpans_in_slot, where X_total_in_slot is the maximum number of non-overlapping CCEs (or BDs, respectively) and maxNumSpans_in_slot is the maximum number of non-overlapping spans that may be supported within the slot duration. Here, Xtotal_in_slot=f*X_R15, where 'f' is the multiplicative factor and X_R15 is the number of non-overlapping CCEs (or BDs) per slot according to Release 15 specifications for the corresponding numerology.

In some examples, the multiplicative factors reported by the UE as part of the UE capability reporting may be traded off with the reported PDCCH monitoring capabilities reported for CA configurations. In some examples, the multiplicative factors for requirements on total numbers of BDs/CCEs per slot when configured with enhanced PDCCH monitoring may be non-integer.

In some examples, the above characterization for requirements on BDs/CCEs for enhanced PDCCH monitoring can be used to specify the requirements for each numerology, instead of being reported by the UE via the capability signaling framework. Under this approach, the UE may only indicate its capability of enhanced PDCCH monitoring (and possibly its capability with respect to span durations and span-gaps) as discussed above.

In some examples, whether and how the new requirements and constraints may apply to PDCCHs in UE-SS and/or CSS may be defined. For instance, a predefined mapping may be defined between the span location within the slot and the search space(s) to be monitored. In some examples, the new constraints may apply only to PDCCHs monitored in UE-SS. Alternatively, the new constraints may apply to all PDCCHs monitored in both UE-SS and CSS. In another example, the new constraints may apply to both UE-SS as well as sub-set(s) of CSS types (e.g., Type 3 CSS; Type 1 CSS with dedicated RRC configuration as well as Type 3 CSS; or Type0, 0A and 2 CSS, or combinations of them, among others).

To maintain the scheduling flexibility of Release 15 (e.g., scheduling of common control messages), in some examples, the minimum number of BDs/CCEs that a UE is expected to support within a span or sub-slot corresponding to the first two or three symbols of a slot may be different from the number of BDs/CCEs in subsequent spans/sub-slots within a slot. Further, in an example, the minimum numbers of BDs/CCEs within the span that corresponds to the first two or three symbols of a slot can be the same as the slot-level requirements in Release 15, but with additional per-slot requirements defined in addition to the per-span requirements (e.g., for other spans in the slot). Such additional per-slot requirements may be defined, for example, using the mechanisms described here regarding indication of multiplicative factors to determine new slot-level requirements. In this example, the number of BDs/CCEs in the first span in the slot (e.g., within first two or three symbols in the slot) are subtracted from the overall slot-level limits, and the result is divided (e.g., equally) into subsequent spans within the slot.

In some examples, such as where special handling is assigned to a span corresponding to the first two to three symbols of a slot, the example described above of counting PDCCH candidates corresponding to a MO of a search space that has PDCCH starting within the span but ending beyond the first two or three symbols of the slot may not apply. Instead, such BDs/CCEs can be counted as part of the next span. Alternatively, the above-described counting approach of accounting for the BDs/CCEs for a MO based on which span the starting symbol of the MO belongs to may apply to the first span in the slot.

In some examples, the PDCCH monitoring requirements may be defined such that numbers of BDs/CCEs for CSS candidates can use the entire slot-level BD/CCE budget over a single span (which may be shorter than a slot duration). Specifically, the numbers of BDs/CCEs in a span may be equal the slot-level limit only if all PDCCH candidates in the span correspond to PDCCH CSS sets including Types 0, 0A, 1, 2, and 3 PDCCH CCS sets (without RRC configuration). In this example, there may be a single PDCCH span in the slot. If the span includes PDCCH candidates from UE-SS or Type 3 CSS that are specifically configured for the UE, then the span-level limits (which are no larger than the slot-level limits) can apply. Alternatively, the constraint may be relaxed such that the span-level limits may be exceeded to the point where the slot-level limits are reached within a single PDCCH span with both CSS and UE-SS candidates within the span as long as there exists a single span within the slot duration. In yet another example, the span-level limits may be exceeded up to the point where the slot-level limits are reached within a single PDCCH span with both CSS and UE-SS candidates within the span as long as there exists no more than two non-overlapping spans within the slot duration, one of which contains only PDCCH candidates from PDCCH CSS Types 0, 0A, 1, 2, and 3 (without RRC configuration).

Prioritization or Dropping of Rules to Maintain UE BD and CCE Requirements:

In some examples, mapping and dropping rules have been defined such that if, in a slot, the number of PDCCH BD candidates or the number of CCEs for channel estimation exceed the corresponding minimum requirements, then the UE drops the current and all subsequent search space sets configured to be monitored in that slot, where the mapping of the search space sets follow in ascending order of the search space set ID (SS ID). This can result in an entire search space set being dropped even if a single candidate in the search space set results in the total number of BDs or CCEs for channel estimation to exceed the corresponding specified minimum requirements. This may lead to excessive dropping of search space sets, especially for cases in which search space sets are configured with a relatively large number of BD candidates or BD candidates with large aggregation levels (ALs). At least the latter condition is common in URLCC use cases where traffic with low latency and/or high reliability demands is scheduled.

If the constraints are defined on a sub-slot time duration, then the overbooking and dropping rules may be impacted and should therefore be reconsidered.

Considering the potential overlaps between the monitoring occasions, if characterization of a maximum number of BDs/CCEs for channel estimation is defined based on the monitoring occasions, then appropriate UE behavior and dropping and prioritization rules should be specified in case of overlaps. Techniques to reduce the impact of dropping of PDCCH candidates upon exceeding the BD or channel estimation minimum requirements were described above, including identification and prioritization based on location of the monitoring occasions within a slot for the search space set. In some examples, if characterization of a maximum number of BDs/CCEs for channel estimation is defined based on the monitoring occasions, then the UE can prioritize the monitoring occasions within certain symbols (e.g., within the first three symbols) in the case of overlaps between the monitoring occasions.

Similarly, techniques for prioritization and dropping based on the monitoring spans within a slot may be defined. Here, the case where some candidates within a sub-slot (or monitoring span) may be dropped is considered. In one example, the dropping candidates can be defined as those candidates within a search space or at search space set-level, which can be dropped at a sub-slot/span-level rather than a slot-level. In another example, dropping may be defined based on the DCI types transmitted in the SS within a monitoring span or sub-slot duration. In yet another example, the dropping rule can be based on the location of the monitoring spans within a slot for the search space set. For example, the mapping to PDCCH candidates can follow the order of a particular sequence of spans within a slot for the search space set such that the spans within the first three symbols of a slot, or those within every N symbols (N={2, 3, 7, . . . }, N<14) are prioritized for a given search space set.

In yet another instance, the dropping rules can be defined based on the search space (SS) type (e.g., CSS or UE-SS) within which the UE monitors PDCCH candidates, and can depend on how the new constraints apply to PDCCHs in UE-SS and/or CSS, as described above, and/or based on DCI format(s). Accordingly, the corresponding SS(s) may be prioritized over other SSs. In one example, the corresponding SS(s) may be exempted from dropping rules unless all candidates from other SSs are already dropped and the PDCCH BD candidates or the number of CCEs for channel estimation still exceed the corresponding minimum requirements. Further, if a pre-defined mapping is defined between the span location within the slot and the certain search space(s) to be monitored, the dropping rules defined based on the span location within the slot may also imply dropping rules associated with monitored SSs.

DCI-Size Budget Handling:

In order to better adapt to URLLC traffic characteristics and scheduling requirements, a new DCI format, in addition to the existing Release 15 fallback/non-fallback DCI format, can be defined. Thus, the format size and budget handling needs to be considered for the new DCI format.

In some examples, a dynamic handling option (e.g., by configuration) is defined to maintain the existing (e.g., "3+1") budget for scheduling DCI format sizes. In this example, zero-padding bits can be used to size-match the non-fallback UL and DL. In Release 15, the UL and DL non-fallback DCI format are not size-matched, since there is no zero-padding bits considered in the design. In some examples, if the DCI size budget is exceeded with configuration of a new DCI format (e.g., one with new URLLC-optimized size for both DL and UL scheduling), then the network can configure one DCI format size from fallback UL/DL, one from non-fallback UL/DL (e.g., by applying configurable size-matching), and one for the URLLC DCI format UL/DL.

In summary, under the new DCI format proposed here, instead of allowing non-fallback UL and DL DCIs to have two different sizes (which would incur two sizes in the DCI budget), the network may choose to apply zero-padding to size-match the UL/DL non-fallback DCI formats based on higher layer configuration to satisfy the DCI format size budget. With the identifier field in non-fallback DCI, it is possible to identify the UL/DL DCIs, and this approach allows limiting the number of different DCI sizes, without incurring any ambiguity. Accordingly, the UE, if configured by higher layers, may assume that the DCI formats 0_1 and 1_1 are size-matched with zero-padding bits added to the smaller of the DCI formats if the total number of DCI format sizes for data scheduling DCI formats that may be scrambled with C-RNTI (e.g., across DCI formats 0_0, 0_1, 1_0, 1_1, and new DL and UL DCI formats, if introduced) is greater than three at the end of the DCI format size alignment procedure steps, as specified in Section 7.3.1.0 of 3GPP TS 38.212.

Implications of the New Definition of Monitoring Span into Dynamic Signaling of the Monitoring Window:

There are different options to expand the techniques for configuring the monitoring duration, such as dynamic signaling to adapt the monitoring window or periodicity, or both, a flexible bitmap for configuring each slot within one monitoring period as enabled or disabled, slots being identified as monitoring a reduced set of occasions, or combinations of them, among others.

In some examples, an adjusted set of monitoring occasions within a slot is characterized in terms of monitoring spans and span gaps within the slot. In doing so, indication of the monitoring parameters is simplified and signaling overhead is reduced. In some examples, the UE indicates its capability to support such characterization.

In some examples, instead of turning the monitoring of an entire slot "ON" or "OFF" using the monitoring duration parameter or a bitmap of length equal to the monitoring periodicity, some slots may be identified as monitoring a set of occasions over certain subset of all monitoring span(s) in the slot. In an example, such slots may be identified through the location of 0s within the bitmap (which may be carried by the search space set configuration via dedicated RRC signaling).

In some examples, there may be no restriction to a slot duration being the minimum granularity for indicated monitoring configurations via monitoring duration or bitmap options, as such (UE-specific) configurations can be applicable and extended for durations of monitoring spans.

Figure 9:
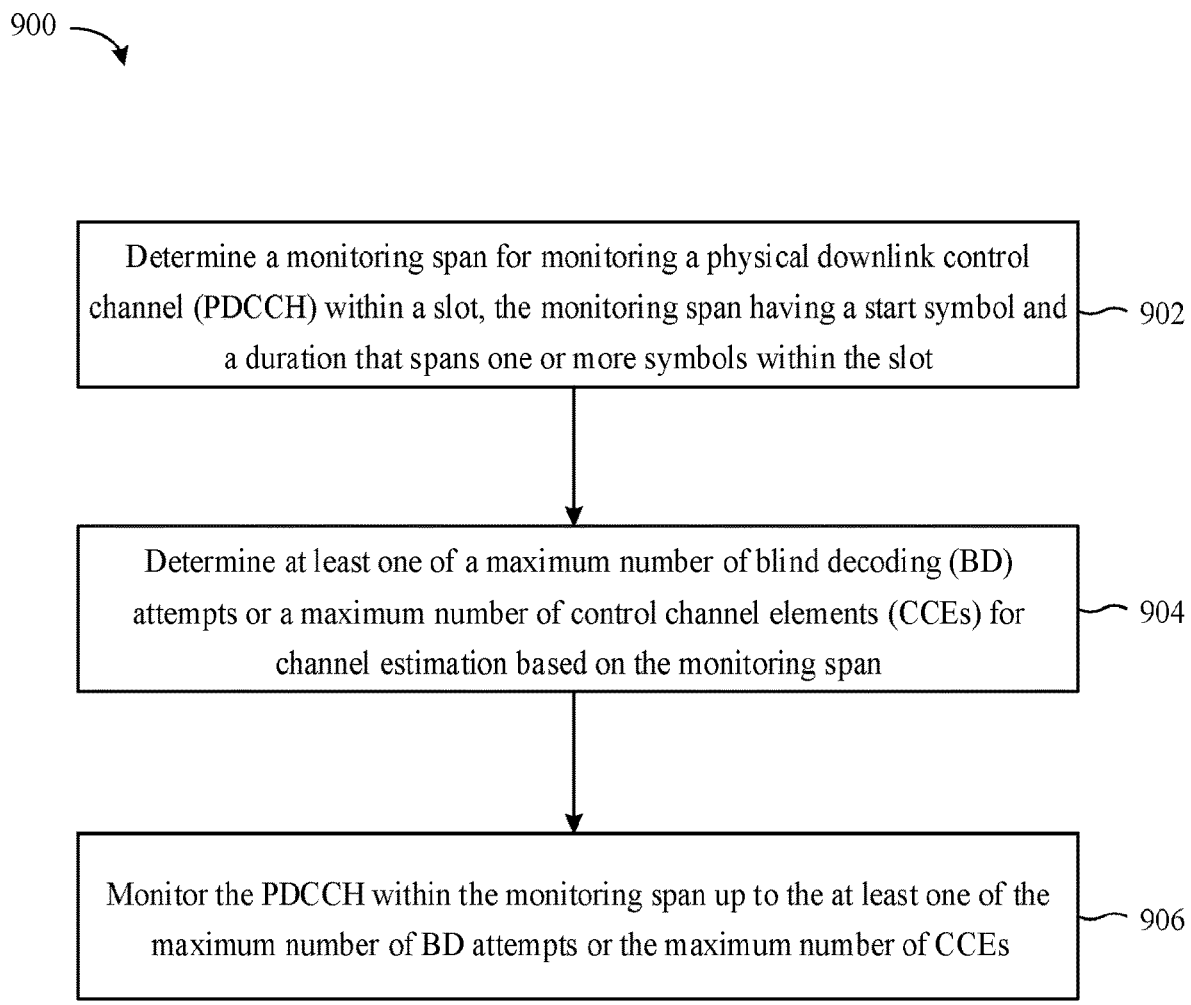
FIG. 9 illustrates an example process for enhanced PDCCH monitoring.

FIG. 9 illustrates a flowchart of an example process 900 for enhanced PDCCH monitoring. In some examples, the electronic device(s), network(s), system(s), chip(s) or component(s), or portions or implementations thereof, of FIGS. 1-8 may be configured to perform the process 900.

Operations of the process 900 include determining a monitoring span for monitoring a physical downlink control channel (PDCCH) within a slot (902). The monitoring span can be determined by, for example, a UE (e.g., a UE 101) or a base station (e.g., a RAN node 111, such as a gNb or eNb). The monitoring span includes a start symbol and a duration that spans one or more symbols within the slot. The start symbol can be defined relative to a boundary of the slot or relative to a PDCCH monitoring occasion, among others. The duration of the monitoring span can be one, two, or three symbols (e.g., OFDM symbols), or greater than three symbols (e.g., 4, 6, or 7 symbols). In some examples, at least one of the start symbol or the duration of the monitoring span is configured to change across slots.

At least one of the start symbol or the duration of the monitoring span can be determined based on a configured Channel Resource Set (CORESET) or search space configuration. In some examples, a signal received from a base station (e.g., via higher layer signaling, MAC CE signaling, DCI signaling, among others) can include an indication of at least one of the start symbol or the duration of the monitoring span. In some examples, a signal is transmitted (e.g., by a UE and to a base station) indicating one or more PDCCH monitoring capabilities of the UE, and another signal is received (e.g., at the UE and from the base station) indicating one or more parameters of the monitoring span, where the one or more parameters are determined based at least in part on the PDCCH monitoring capabilities of the user equipment.

Based on the monitoring span, at least one of a maximum number of blind decoding (BD) attempts or a maximum number of control channel elements (CCEs) for channel estimation for the monitoring span can be determined (904). In some examples, at least one of the maximum number of BD attempts or the maximum number of CCEs are determined by $X\_total\_in\_slot/maxNumMaxSpans\_in\_slot$, where $X\_total\_in\_slot$ is a maximum number of available non-overlapping CCEs or BDs and $maxNumSpans\_in\_slot$ is a maximum number of non-overlapping monitoring spans supported within the slot.

The PDCCH is monitored within the monitoring span up to the at least one of the maximum number of BD attempts or the maximum number of CCEs (906). In some examples, a CORESET associated with the PDCCH is fully contained within the monitoring span. Alternatively, a CORESET associated with the PDCCH can extend beyond the monitoring span, and a first symbol of the CORESET is within the monitoring span. In some examples, a second monitoring span within the slot is determined, where the second monitoring span does not overlap with the monitoring span. At least one of a maximum number of BD attempts or a maximum number of CCEs for channel estimation for the second monitoring span can be determined that are different from the at least one of a maximum number of BD attempts or a maximum number of CCEs for channel estimation for the monitoring span. One or more PDCCH candidates can be dropped based on the monitoring span. In some examples, the monitoring span can be truncated when it is determined that the monitoring span extends across a boundary of the slot. In some examples, the monitoring span can be adjusted in response to an indication of a change (e.g., an increase or decrease) in a number of the monitoring occasions within the slot. A PDCCH monitoring search space (e.g., a CSS or UE-SS) can be constrained based on the at least one of the maximum number of BD attempts or the maximum number of CCEs.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

In various examples, one or more of the techniques described here can be implemented by: a system; an apparatus; one or more non-transitory computer-readable media comprising instructions to cause an electronic device, upon execution of the instructions by one or more processors of the electronic device, to perform one or more of the techniques described here; a method, technique, or process, a datagram, packet, frame, segment, protocol data unit (PDU), or message; a signal encoded with data; an electromagnetic signal carrying computer-readable instructions, wherein execution of the computer-readable instructions by one or more processors is to cause the one or more processors to perform one or more of the techniques described here; a computer program comprising instructions, wherein execution of the program by a processing element is to cause the processing element to carry out one or more of the techniques described here; or chip(s), microchip(s), system-on-a-chip(s), integrated circuit; or combinations of them, among others.

The following terms and definitions may be applicable to the examples described herein.

The term "circuitry" as used herein refers to a circuit or system of multiple circuits configured to perform a particular function in an electronic device. The circuit or system of circuits may be part of or include hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some examples, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these examples, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof.

The term "device" refers to a physical entity embedded inside, or attached to, another physical entity in its vicinity, with capabilities to convey digital information from or to that physical entity.

The term "entity" refers to a distinct component of an architecture or device, or information transferred as a payload.

The term "controller" refers to an element or entity that has the capability to affect a physical entity, such as by changing its state or causing the physical entity to move.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier." "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "admission control" refers to a validation process in communication systems where a check is performed before a connection is established to see if current resources are sufficient for the proposed connection.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/DC.

The term "Special Cell" refers to the PCell of the MCG or the PSCell of the SCG for DC operation; otherwise, the term "Special Cell" refers to the Pcell.

What is claimed is:

1. A method, comprising:
   determining a monitoring span for monitoring a physical downlink control channel (PDCCH) within a slot, the monitoring span having a start symbol and a duration that spans one or more symbols within the slot;
   determining at least one of a maximum number of blind decoding (BD) attempts or a maximum number of control channel elements (CCEs) for channel estimation based on the monitoring span;
   monitoring the PDCCH within the monitoring span up to the at least one of the maximum number of BD attempts or the maximum number of CCEs; and
   adjusting the monitoring span in response to an indication of a change in a number of monitoring occasions within the slot.

2. The method of claim 1, wherein the start symbol of the monitoring span is defined relative to a boundary of the slot.

3. The method of claim 1, wherein the start symbol of the monitoring span is defined relative to a PDCCH monitoring occasion.

4. The method of claim 1, wherein the duration of the monitoring span is greater than three symbols.

5. The method of claim 1, wherein at least one of the start symbol or the duration of the monitoring span is determined based on a configured Channel Resource Set (CORESET) or search space configuration.

6. The method of claim 1, further comprising receiving, from a base station, a signal including an indication of at least one of the start symbol or the duration of the monitoring span.

7. The method of claim 1, wherein a Channel Resource Set (CORESET) associated with the PDCCH is fully contained within the monitoring span.

8. The method of claim 1, wherein a Channel Resource Set (CORESET) associated with the PDCCH extends beyond the monitoring span, and wherein a first symbol of the CORESET is within the monitoring span.

9. The method of claim 1, further comprising determining a second monitoring span within the slot, wherein the second monitoring span does not overlap with the monitoring span.

10. The method of claim 9, further comprising determining at least one of a maximum number of BD attempts or a maximum number of CCEs for channel estimation for the second monitoring span that are different from the at least one of a maximum number of BD attempts or a maximum number of CCEs for channel estimation for the monitoring span.

11. The method of claim 1, wherein at least one of the start symbol or the duration of the monitoring span is configured to change across slots.

12. The method of claim 1, further comprising:
transmitting, by a user equipment and to a base station, a signal indicating one or more PDCCH monitoring capabilities of the user equipment; and
receiving, at the user equipment and from the base station, a signal indicating one or more parameters of the monitoring span, wherein the one or more parameters are determined based at least in part on the PDCCH monitoring capabilities of the user equipment.

13. The method of claim 1, wherein the at least one of the maximum number of BD attempts or the maximum number of CCEs are determined by X_total_in_slot/maxNumMaxSpans_in_slot, where X_total_in_slot is a maximum number of available non-overlapping CCEs or BDs and maxNumSpans_in_slot is a maximum number of non-overlapping monitoring spans supported within the slot.

14. The method of claim 1, further comprising dropping one or more PDCCH candidates based on the monitoring span.

15. The method of claim 1, further comprising truncating the monitoring span when it is determined that the monitoring span extends across a boundary of the slot.

16. The method of claim 1, further comprising constraining a PDCCH monitoring search space based on the at least one of the maximum number of BD attempts or the maximum number of CCEs.

17. The method of claim 16, wherein the search space comprises a common search space (CSS) or a user equipment specific search space (UE-SS).

18. A device, comprising:
one or more processors; and
memory storing instructions which, when executed by the one or more processors, cause the one or more processors to perform operations comprising:
determining a monitoring span for monitoring a physical downlink control channel (PDCCH) within a slot, the monitoring span having a start symbol and a duration that spans one or more symbols within the slot;
determining at least one of a maximum number of blind decoding (BD) attempts or a maximum number of control channel elements (CCEs) for channel estimation based on the monitoring span;
monitoring the PDCCH within the monitoring span up to the at least one of the maximum number of BD attempts or the maximum number of CCEs; and
adjusting the monitoring span in response to an indication of a change in a number of monitoring occasions within the slot.

19. The device of claim 18, wherein the device is one or more processors or a user equipment (UE).

20. A non-transitory computer readable storage medium storing instructions which, when executed by one or more processors, cause the one or more processors to perform operations comprising:
determining a monitoring span for monitoring a physical downlink control channel (PDCCH) within a slot, the monitoring span having a start symbol and a duration that spans one or more symbols within the slot;
determining at least one of a maximum number of blind decoding (BD) attempts or a maximum number of control channel elements (CCEs) for channel estimation based on the monitoring span;
monitoring the PDCCH within the monitoring span up to the at least one of the maximum number of BD attempts or the maximum number of CCEs; and
adjusting the monitoring span in response to an indication of a change in a number of monitoring occasions within the slot.

* * * * *